(12) United States Patent
Etori et al.

(10) Patent No.: US 7,788,012 B2
(45) Date of Patent: Aug. 31, 2010

(54) VEHICLE HEADWAY DISTANCE CONTROL APPARATUS AND METHOD

(75) Inventors: Nariaki Etori, Kanagawa (JP); Kenichi Egawa, Tama (JP); Satoshi Tange, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 845 days.

(21) Appl. No.: 11/683,529

(22) Filed: Mar. 8, 2007

(65) Prior Publication Data

US 2007/0213914 A1    Sep. 13, 2007

(30) Foreign Application Priority Data

Mar. 10, 2006   (JP) ............................. 2006-066540

(51) Int. Cl.
*B60K 31/00* (2006.01)
(52) U.S. Cl. .......................................... 701/96; 701/70
(58) Field of Classification Search ................... None
See application file for complete search history.

(56) References Cited

U.S. PATENT DOCUMENTS

| | | | |
|---|---|---|---|
| 5,847,644 A | 12/1998 | Weisman, II et al. | |
| 6,076,622 A | 6/2000 | Chakraborty et al. | |
| 6,434,472 B1 | 8/2002 | Minowa et al. | |
| 6,621,176 B1 | 9/2003 | Nagasaka et al. | |
| 6,975,931 B2 * | 12/2005 | Adachi ........................ | 701/96 |
| 7,113,076 B2 | 9/2006 | Yamamura | |

FOREIGN PATENT DOCUMENTS

| | | |
|---|---|---|
| DE | 100 42 557 A1 | 4/2001 |
| EP | 1 359 047 A2 | 11/2003 |
| JP | 2002-234358 A | 8/2002 |
| JP | 2005-329786 | 12/2005 |
| JP | 2005-343268 A | 12/2005 |

* cited by examiner

*Primary Examiner*—Michael J. Zanelli
(74) *Attorney, Agent, or Firm*—Global IP Counselors, LLP

(57) ABSTRACT

A vehicle headway distance control apparatus is provided with a first deceleration control system for controlling the deceleration of a vehicle according to a distance between the host vehicle and a preceding obstacle, and a second deceleration control system, which is different from the first deceleration control system and which controls the deceleration of a vehicle according to the same distance. A driver operable selection section is configured to allow a driver to arbitrarily turn "on" and "off" each of the first and second deceleration control systems, but prohibit simultaneously operation of both of the first and second deceleration control systems.

18 Claims, 26 Drawing Sheets

|  | HEADWAY CONTROL SYSTEM | | |
|---|---|---|---|
|  | OFF | ON | |
|  |  | STANDBY | OPERATIONAL |
| TRACKING CONTROL SYSTEM — OFF | F | A → ← B | C → ← D ← E |
| TRACKING CONTROL SYSTEM — ON | ↑↓ G |  |  |

Fig. 7

|  |  | HEADWAY CONTROL SYSTEM | | |
|---|---|---|---|---|
|  |  | OFF | ON | |
|  |  |  | STANDBY | OPERATIONAL |
| TRACKING CONTROL SYSTEM | OFF | STATE 1 | STATE 2 | STATE 3 |
|  | ON | STATE 4 | STATE 5 | STATE 6 |

*Fig. 12*

VEHICLE HEADWAY DISTANCE CONTROL APPARATUS AND METHOD

CROSS-REFERENCE TO RELATED APPLICATIONS

This application claims priority to Japanese Patent Application No. 2006-066540, filed on Mar. 10, 2006. The entire disclosure of Japanese Patent Application No. 2006-066540 is hereby incorporated herein by reference.

BACKGROUND OF THE INVENTION

1. Field of the Invention

The present invention generally relates to a vehicle headway distance control apparatus for controlling the deceleration of a vehicle. More specifically, the present invention relates to a vehicle headway distance control, which allows a driver a certain range of flexibility to adjust a type of deceleration control of the vehicle.

2. Background Information

Vehicle assist systems are known that control the acceleration and deceleration of a vehicle to allow the vehicle to follow a preceding vehicle while maintaining a constant headway distance from the preceding vehicle. An example of this type of vehicle assist system is disclosed in Japanese Laid-Open Patent Application No. 2005-329786. Also known are systems that control the deceleration of a vehicle on the basis of the sensed headway distance so as to ensure a headway distance from the preceding vehicle. An example of this type of vehicle assist system is disclosed in U.S. Pat. No. 7,113,076.

In view of the conventional headway maintenance assist systems, it will be apparent to those skilled in the art from this disclosure that there exists a need for an improved vehicle headway distance control apparatus. This invention addresses this need in the art as well as other needs, which will become apparent to those skilled in the art from this disclosure.

SUMMARY OF THE INVENTION

It has been discovered that in cases in which multiple systems are provided in a vehicle for controlling deceleration as described above, there is a possibility that multiple deceleration controls having different control specifics will operate at the same time. Thus, these controls may switch regardless of the intentions of the driver. In this situation, the driver may misinterpret or rely too heavily on these controls.

In accordance with one aspect of the present invention, a vehicle headway distance control apparatus is provided that basically comprises a first deceleration control system, a second deceleration control system and a driver operable selection section. The first deceleration control system is configured to perform a first deceleration control of a host vehicle according to a detected distance between the host vehicle and a preceding obstacle. The second deceleration control system is configured to perform a second deceleration control of the host vehicle according to the detected distance, in which the second deceleration control is different from the first deceleration control. The driver operable selection section is configured to allow a driver to arbitrarily turn "on" and "off" each of the first and second deceleration control systems, while prohibiting simultaneous operation of both of the first and second deceleration control systems.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 7 is a diagram showing the state transitions between the tracking control system and the headway distance control system;

FIG. 12 is a diagram showing the states of the tracking control system and the headway distance control system;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
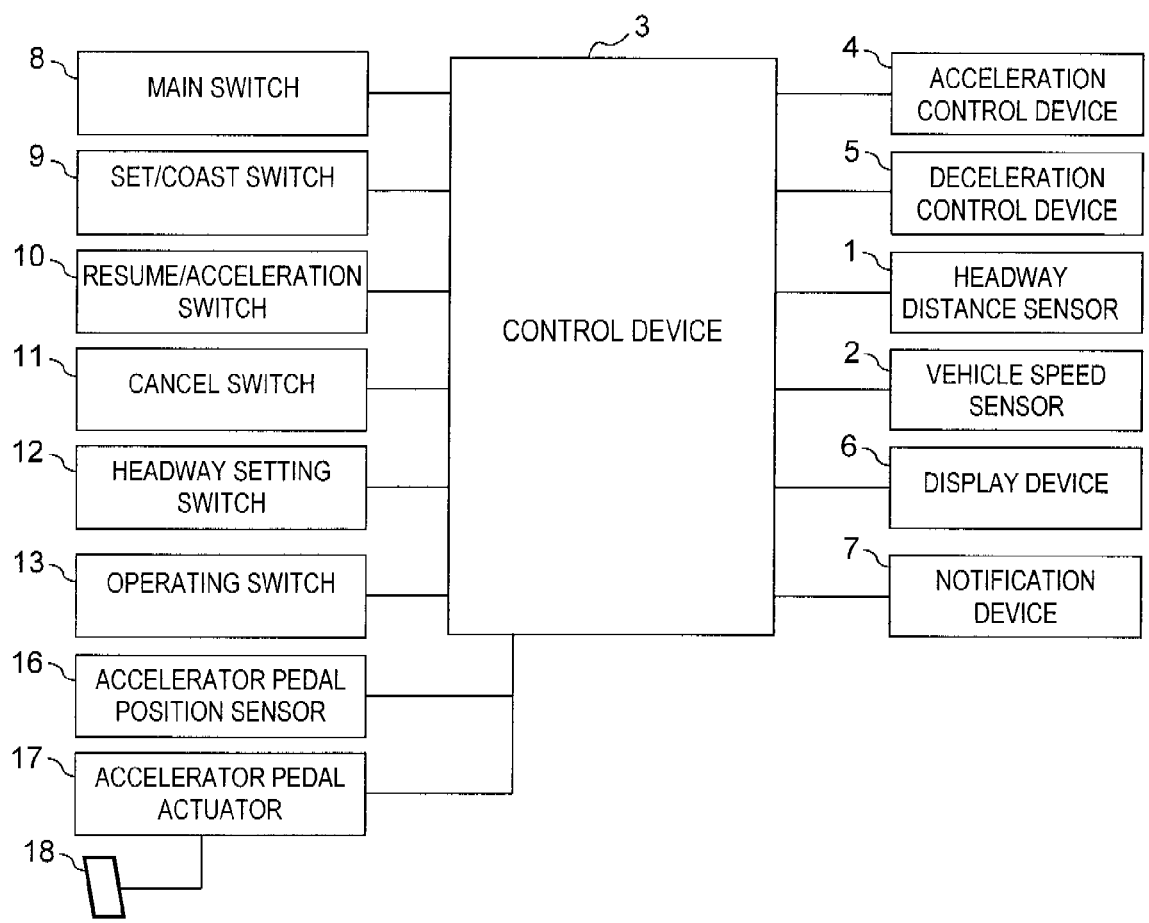
FIG. 1 is a block diagram showing a configuration of a headway maintenance assist system having a vehicle headway distance control apparatus in accordance with a first embodiment of the present invention.
Figure 2:
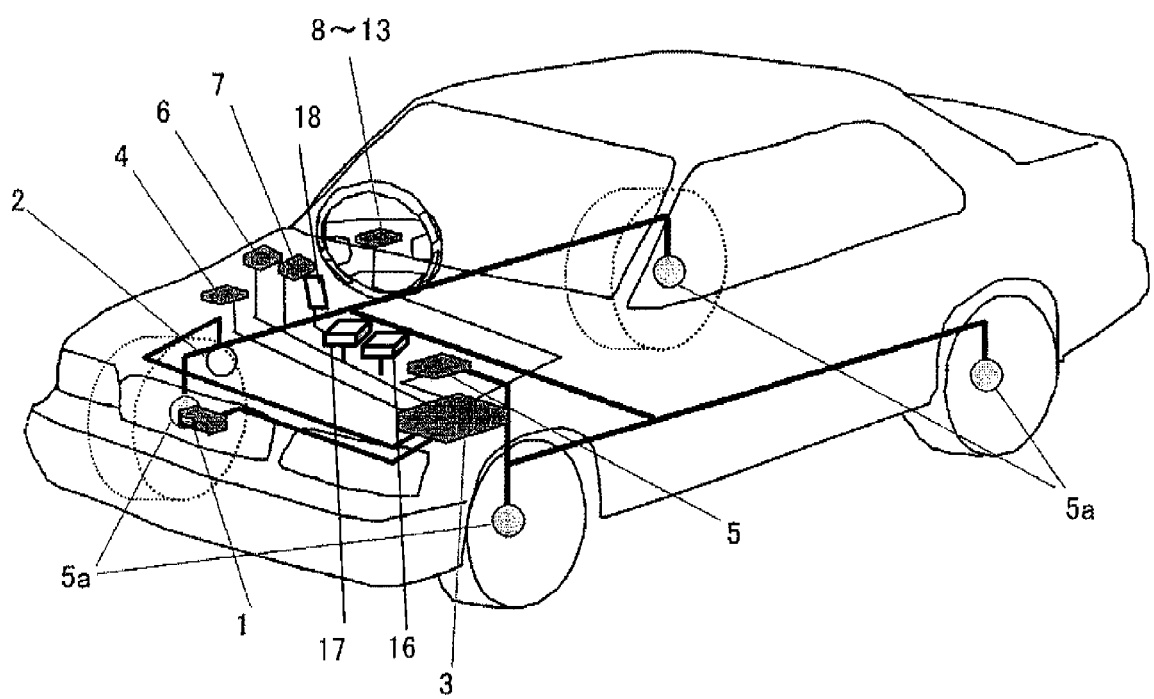
FIG. 2 is a structural diagram of a vehicle equipped with the headway maintenance assist system shown in FIG. 1.

Referring initially to FIGS. 1 and 2, a headway maintenance assist system is illustrated that is installed on a host vehicle (FIG. 2) with a vehicle headway distance control apparatus in accordance with a first embodiment of the present invention. In particular, FIG. 1 is a system diagram showing the constituent features of the vehicle headway distance control apparatus of the headway maintenance assist system in accordance with a first embodiment of the present invention, while FIG. 2 is a diagrammatic view of a vehicle having the headway maintenance assist system installed therein. The main features of the headway maintenance assist system will now be explained. The vehicle headway distance control apparatus includes a headway distance sensor 1, a vehicle speed sensor 2, a control device or unit 3, an acceleration control device or unit 4, a deceleration control device or unit 5, a display device or unit 6, and a notification device or unit 7. Furthermore, the vehicle headway distance control apparatus a driver operable selection section that includes a main switch 8, a set/coast switch 9, a resume/acceleration switch 10, a cancel switch 11, a headway setting switch 12, an operating switch 13, and an accelerator pedal position sensor 16, which are operated by the driver, are all connected to the control device 3.

The headway distance sensor 1 includes a laser device that senses a preceding vehicle by sending laser light out in front of the host vehicle to detect the headway distance from the sensed preceding vehicle. The laser device can also be configured to sense the relative speeds of the host vehicle and the preceding vehicle from the sensed headway distance. The vehicle speed sensor 2 senses the speed of the host vehicle.

The control device 3 is configured from a CPU, ROM, RAM, and other CPU-associated components, and the control device controls the entire headway maintenance assist system on the basis of input signals from the sensors and switches. Specifically, the control device 3 performs tracking control for allowing the vehicle to automatically follow a preceding vehicle. The control is performed on the basis of the headway distance detected by the headway distance sensor 1, and the speed of the host vehicle detected by the vehicle speed sensor 2. In other words, the acceleration control device 4 and the deceleration control device 5 are controlled so that the headway distance between the host vehicle and the preceding vehicle is kept substantially constant, using a preset vehicle speed as an upper limit. Furthermore, the control device 3 controls the headway distance by controlling the deceleration control device 5 and reducing the speed of the vehicle so as to ensure a headway distance with the preceding vehicle in cases in which the headway distance detected by the headway distance sensor 1 falls below a preset threshold.

The acceleration control device 4 includes a throttle actuator, for example, and controls the acceleration of the vehicle by controlling the opening and closing of a throttle valve (not shown) on the basis of instructions from the control device 3. The deceleration control device 5 includes a brake actuator, for example, and controls the braking force of hydraulic brakes 5a provided to the wheels of the vehicle on the basis of instructions from the control device 3. The hydraulic brakes 5a operate under the control of the deceleration control device 5, and the driver operates the brakes by operating a brake pedal (not shown).

The display device 6 is configured from a liquid crystal monitor, for example, and the display device displays the state of the preceding vehicle tracking control and headway distance control as performed by the headway maintenance assist system according to instructions from the control device 3. The notification device 7 is composed of a notification buzzer, for example, and the notification device notifies the driver of the state of the preceding vehicle tracking control and the headway distance control according to instructions from the control device 3.

An accelerator pedal actuator 17 applies reaction force to an accelerator pedal 18 on the basis of instructions from the control device 3. This reaction force is applied in the direction opposite from the direction in which the driver depresses the accelerator pedal.

The headway distance sensor 1, the vehicle speed sensor 2, the control device 3, the acceleration control device 4, the deceleration control device 5, the display device 6, the notification device 7, the main switch 8, the set/coast switch 9, the resume/acceleration switch 10, the cancel switch 11, and the headway setting switch 12 constitute a preceding vehicle tracking control system. The headway distance sensor 1, the vehicle speed sensor 2, the control device 3, the deceleration control device 5, the display device 6, the notification device 7, the operating switch 13, and the accelerator pedal position sensor 16 constitute the main components of a headway distance control system.

The main switch 8, the set/coast switch 9, the resume/acceleration switch 10, the cancel switch 11, the headway setting switch 12, and the operating switch 13 are provided at positions on the steering wheel where they can be easily operated by the driver. The main switch 8 is used to turn the tracking control system "on" and "off". The set/coast switch 9 is used to initiate control when control has not been initiated by the tracking control system. When the tracking control system is in effect, operating the set/coast switch 9 reduces the set vehicle speed.

The resume/acceleration switch 10 is used to initiate control while preserving the previous settings when control has not been initiated by the tracking control system. Operating the resume/acceleration switch 10 increases the set vehicle speed when the tracking control system is in effect.

The cancel switch 11 is used to release control when the tracking control system is in effect. The headway setting switch 12 is used to vary the headway distance (target headway distance) to the preceding vehicle. The operating switch 13 is used to turn the headway distance control system "on" and "off".

Next, the operation performed by the vehicle headway distance control apparatus of the headway maintenance assist system will be described.

In the vehicle headway distance control apparatus, the tracking control system controls the tracking of the preceding vehicle and the headway distance control system controls the headway distance, as described above. The tracking control system calculates a target speed for the vehicle to follow the preceding vehicle on the basis of the sensed headway distance to the preceding vehicle and of the speed of the host vehicle. The tracking control system then controls acceleration and deceleration so as to achieve the target speed. The tracking control system releases control when the brake pedal is operated. Furthermore, acceleration and deceleration control ceases and the operations of the driver take precedence while the driver is accelerating.

The headway distance control system controls deceleration so as to ensure a headway distance to the preceding vehicle when the host vehicle approaches the preceding vehicle, and does not release control even if the brake pedal is operated. Thus, the control device 3 constitutes, among other things, a driving/braking force controller of the headway distance control system and the tracking control system. The headway distance control performed by the headway distance control system will now be described with reference to FIGS. 3 through 6.

Figure 3:
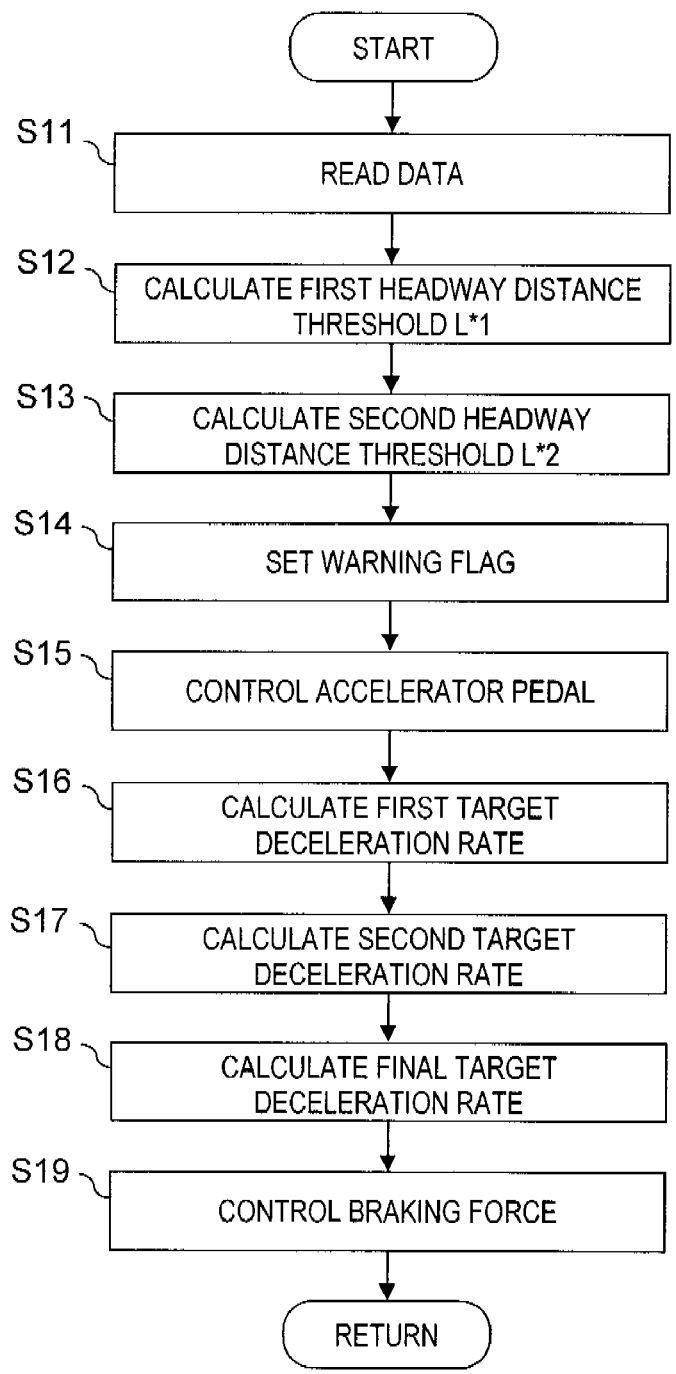
FIG. 3 is a flowchart showing the specifics of the process performed by the vehicle headway distance control apparatus.

FIG. 3 is a flowchart showing the process performed by the headway distance control system in the first embodiment. When the host vehicle is started up, the control device 3 initiates the process step S11. In step S11, the following data is read, e.g., the accelerator pedal position Acc detected by the accelerator pedal position sensor 16, the speed of the host vehicle detected by the vehicle speed sensor 2, and the headway distance L and the relative speed Vr with respect to the preceding vehicle as detected by the headway distance sensor (laser radar, for example) 1. The process then advances to step S12. The vehicle speed sensor 2 is configured so that the wheel speeds Vw1, Vw2, Vw3, Vw4 of the vehicle can be sensed as the speed of the vehicle.

In step S12, the first headway distance threshold $L*1$ is calculated. The first headway distance threshold $L*1$ is calculated from the sum of a steady-state term $L*h1$, which does not depend on the running condition of the host vehicle, and a transient term $L*r1$, which depends on the running condition of the host vehicle. The specific method for calculating the first headway distance threshold $L*1$ will be described using the flowchart shown in FIG. 4.

Figure 4:
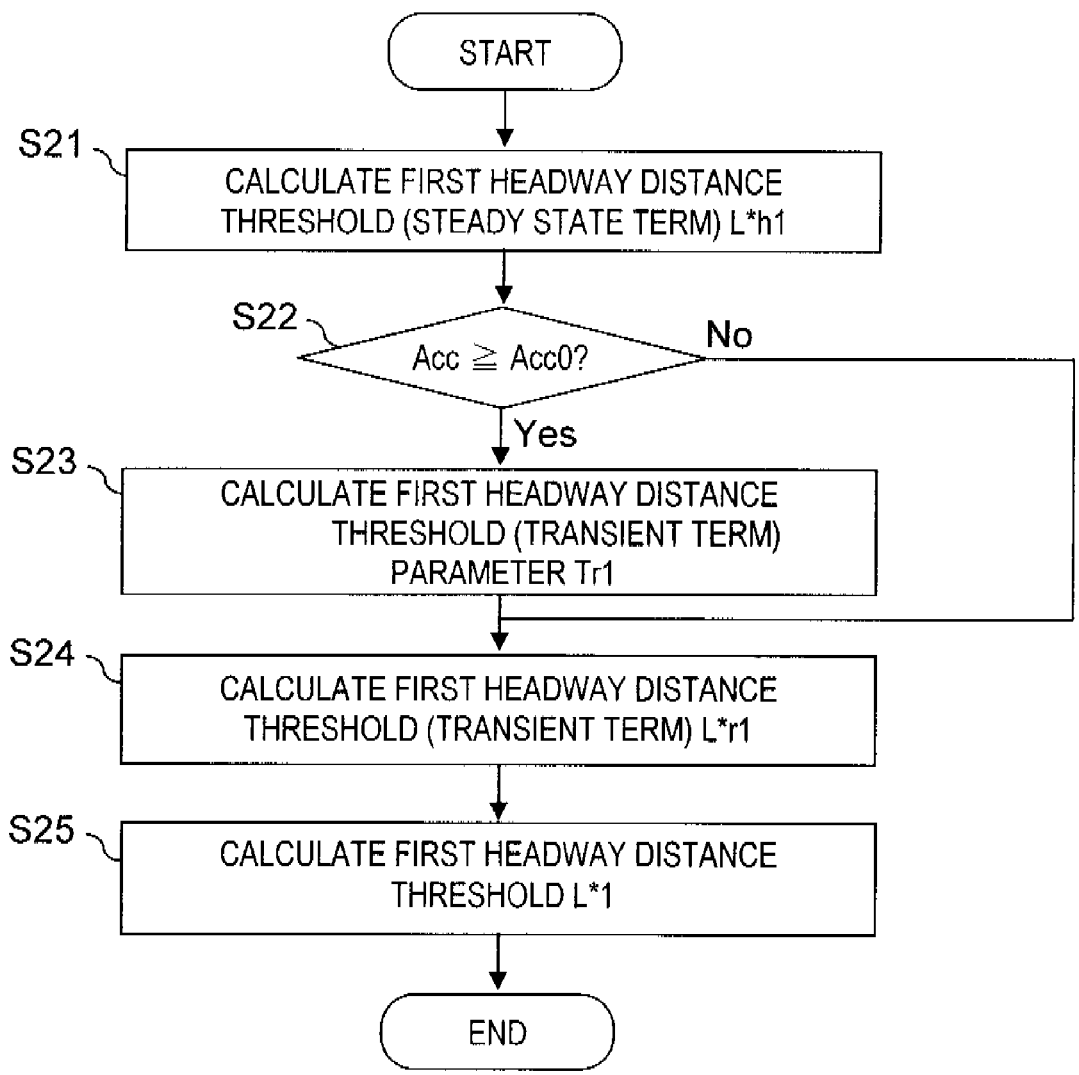
FIG. 4 is a flowchart showing the specific method executed by the control unit for calculating the first headway distance threshold L*1.

In step S21 of the flowchart shown in FIG. 4, the steady-state term $L*h1$ is calculated according to Equation 1 below.

$$L*h1 = Va \times Th \qquad \text{(Equation 1)}$$

In this Equation 1, the parameter Va represents the speed of the preceding vehicle as calculated based on the speed V of the host vehicle and the relative speed Vr, while the parameter Th represents a specific headway time of the host vehicle. The speed V of the host vehicle is calculated by determining a mean value of the speeds Vw1 and Vw2 of the front wheels as detected by the vehicle speed sensor 2.

In step S22, which follows step S21, the control device 3 determines whether the accelerator pedal position Acc detected by the accelerator pedal position sensor 16 is equal to or greater than a specific accelerator pedal position threshold Acc0. If the accelerator pedal position Acc is determined to be equal to or greater than the specific accelerator pedal position threshold Acc0, then it is determined that the driver is depressing on the accelerator pedal 18. Thus, an accelerator operation flag Facc is turned "on" when it is determined that the driver is depressing on the accelerator pedal 18, and then the process advances to step S23. If the accelerator pedal position Acc is determined to be less than the specific accelerator pedal position threshold Acc0, then it is determined that the driver is not depressing on the accelerator pedal 18. Thus, the accelerator operation flag Facc is turned "off" when it is determined that the driver is not depressing on the accelerator pedal 18, and then the process advances to step S24.

In step S23, Equation 2 is used to calculate a first transient term parameter Tr1 for calculating the transient term $L*r1$ of the first headway distance threshold $L*1$.

$$Tr1 = (L - L*h1)/Vr \qquad \text{(Equation 2)}$$

In this Equation 2, the first transient term parameter Tr1 is the time taken for the headway distance L to reach the steady-state term $L*h1$ of the first headway distance threshold, assuming that the current relative speed Vr is maintained. When the parameter Tr1 is calculated, the process advances to step S24.

As can be seen from the process in steps S22 and S23, the first transient term parameter Tr1 for calculating the transient term $L*r1$ of the first headway distance threshold is calculated (renewed) only when the accelerator operation flag Facc is turned "on". Therefore, the first transient term parameter Tr1 is set according to the actual headway distance L when the accelerator pedal 18 is being depressed, and the parameter value that was in effect when the accelerator pedal 18 ceased to be depressed is maintained when the accelerator pedal 18 is not being depressed.

In step S24, the transient term $L*r1$ of the first headway distance threshold $L*1$ is calculated according to Equation 3, and the process advances to step S25.

$$L*r1 = Tr1 \times Vr \qquad \text{(Equation 3)}$$

In step S25, the first headway distance threshold $L*1$ is calculated by adding together the steady-state term $L*h1$ of the first headway distance threshold calculated in step S21, and the transient term $L*r1$ of the headway distance threshold calculated in step S23 (see Equation 4).

$$L*1 = L*h1 + L*r1 \qquad \text{(Equation 4)}$$

When the accelerator pedal 18 is being depressed (when the accelerator operation flag Facc is turned "on"), $L*1 = L$ according to Equations 2, 3, and 4. After the first headway distance threshold $L*1$ is calculated, then the process advances to step S13 in the flowchart shown in FIG. 3.

Figure 25:
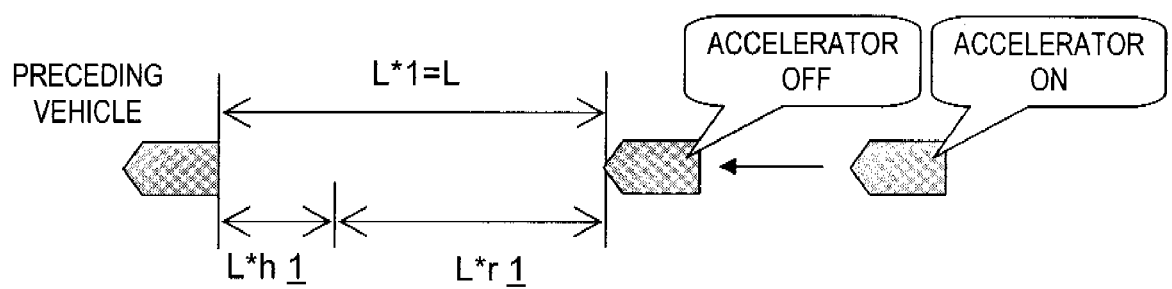
FIG. 25 is a diagram showing the headway distance threshold value L* when the driver has released the accelerator pedal.

FIG. 25 is a diagram showing the headway distance threshold $L*1$ when the driver ceases to depress on the accelerator pedal 18 (i.e., when the accelerator operation flag Facc is turned from "on" to "off"). The headway distance threshold $L*1$ is set to the headway distance L at the time the accelerator pedal 18 ceases to be depressed, as shown in FIG. 25.

In step S13, the second headway distance threshold $L*2$ is calculated. The second headway distance threshold $L*2$ is calculated from the sum of a steady-state term $L*h2$ calculated regardless of whether the preceding vehicle is decelerating or not and a transient term $L*r2$ calculated (updated) when the preceding vehicle is decelerating. The specific method for calculating the second headway distance threshold $L*2$ will now be described using the flowchart shown in FIG. 5.

Figure 5:
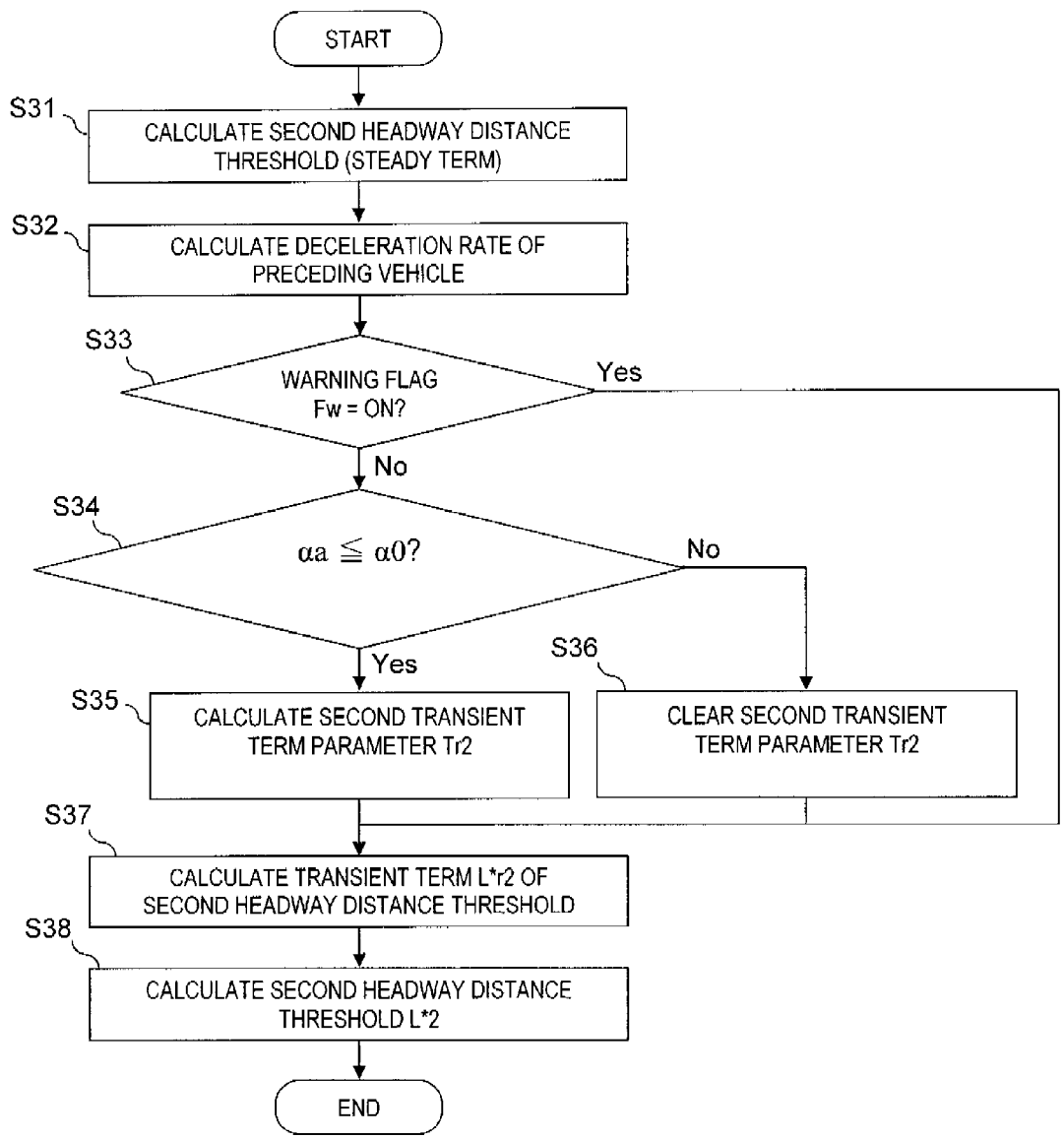
FIG. 5 is a flowchart showing the specific method executed by the control unit for calculating the second headway distance threshold L*2.

In step S31 in the flowchart shown in FIG. 5, the steady-state term L*h2 is calculated based on the speed V of the host vehicle and the relative speed Vr. The function for calculating the steady-state term L*h2 is provided in advance based on the host vehicle speed V and the relative speed Vr. Thus, the steady-state term L*h2 is calculated by substituting the host vehicle speed V and the relative speed Vr into this function. When the steady-state term L*h2 of the second headway distance threshold is calculated, the process advances to step S32.

In step 32 the acceleration/deceleration rate αa of the preceding vehicle is calculated using Equation 5.

$$\alpha a = d(Va)/dt \quad \text{(Equation 5)}$$

When the acceleration/deceleration rate αa of the preceding vehicle is calculated by the time differentiation of the speed Va of the preceding vehicle, the process advances to step S33.

In step S33, a determination is made as to whether a warning flag Fw, which is set in a later-described step S14 (see FIG. 3), has been turned "on". The processes in steps S11 through S19 are repeated, and therefore, the determination in step S33 is made in this case based on the state of the warning flag Fw set during the preceding process. When the warning flag Fw is determined to be "on", the process advances to step S37, and when the warning flag Fw is determined to be "off", the process advances to step S34.

In step S34, the control device 3 determines whether the acceleration/deceleration rate αa of the preceding vehicle as calculated in step S32 is equal to or less than a specific acceleration/deceleration rate α0. The specific acceleration/deceleration rate α0 is a threshold for determining whether the preceding vehicle is decelerating or accelerating. Thus, the values of rates αa and α0 are both positive during acceleration and both negative during deceleration. When the acceleration/deceleration rate αa of the preceding vehicle is determined to be equal to or less than the specific acceleration/deceleration rate α0, the driving/braking force controller 50 determines that the preceding vehicle is decelerating, a preceding vehicle deceleration flag Fdec_a is turned "on", and the process then advances to step S35. When the acceleration/deceleration rate αa of the preceding vehicle is determined to be greater than the specific acceleration/deceleration rate α0, the driving/braking force controller 50 determines that the preceding vehicle is not decelerating, the preceding vehicle deceleration flag Fdec_a is turned "off", and the process advances to step S36.

In step S35, a second transient term parameter Tr2 is calculated from Equation 6, below, for calculating the transient term L*r2 of the second headway distance threshold.

$$Tr2 = (L - L^*h2)/Vr \quad \text{(Equation 6)}$$

In this Equation 6, the second transient term parameter Tr2 is the time resulting from dividing the remaining distance (L−L*h2) by the relative speed Vr. The remaining distance is the actual headway distance L less the steady-state term L*h2 of the second headway distance threshold at the time when the preceding vehicle begins to decelerate. When the second transient term parameter Tr2 has been calculated, the process advances to step S37.

In step S36, which takes effect after it is determined that the preceding vehicle is not decelerating, the second transient term parameter Tr2 is cleared (i.e., set to 0) for calculating the transient term L*r2 of the second headway distance threshold, and the process advances to step S37.

In step S37, the transient term L*r2 of the second headway distance threshold is calculated from Equation 7, below, and the process advances to step S38.

$$L^*r2 = Tr2 \times Vr \quad \text{(Equation 7)}$$

In step S38, the second headway distance threshold L*2 is calculated by adding the steady-state term L*h2 and the transient term L*r2 of the second headway distance threshold (see Equation 8).

$$L^*2 = L^*h2 + L^*r2 \quad \text{(Equation 8)}$$

In step S38, when the second headway distance threshold L*2 has been calculated, the process advances to step S14 in the flowchart shown in FIG. 3. In step S14, the warning flag Fw is set. Therefore, a deviation ΔL2 between the second headway distance threshold L*2 calculated in step S13 and the headway distance L from the preceding vehicle detected by the laser radar 70 is first calculated using Equation 9, below.

$$\Delta L2 = L^*2 - L \quad \text{(Equation 9)}$$

If the deviation ΔL2 calculated from Equation 9 equal to or greater than 0, the headway distance L from the preceding vehicle is equal to or less than the second headway distance threshold L*2, and the warning flag Fw is therefore turned "on" in step S14. If the deviation ΔL2 is less than 0, the warning flag Fw is turned "off" in step S430. The process then advances to step S15 after the warning flag Fw has been set.

In step S15, accelerator pedal reaction force control is implemented in which the reaction force is applied to the accelerator pedal 18 in accordance with the deviation ΔL2 in the headway distance. The detailed processes of this control accelerator pedal reaction force for applying reaction force to the accelerator pedal 18 are described using the flowchart shown in FIG. 6.

Figure 6:
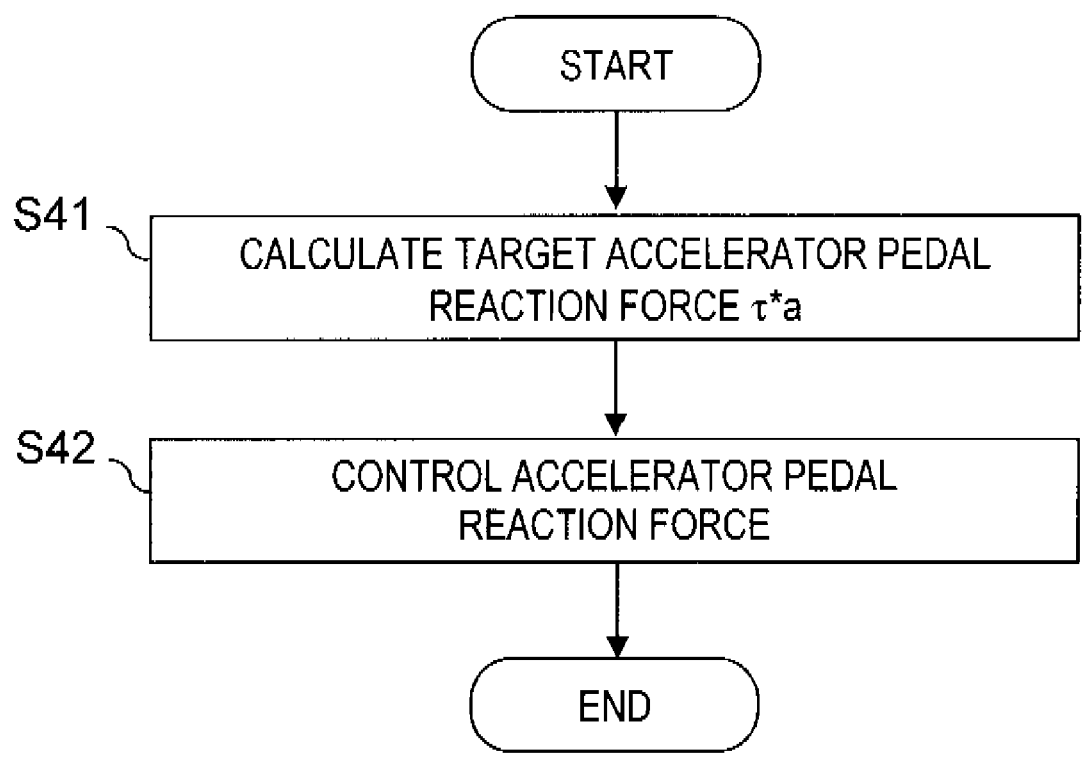
FIG. 6 is a flowchart showing the detailed process executed by the control unit for applying reaction force to the accelerator pedal in the vehicle headway distance control apparatus.

In step S41 of the flowchart shown in FIG. 6, the target accelerator pedal reaction force τ*a is calculated from Equation 10.

$$\tau^*a = Kp \times \Delta L2 \quad \text{(Equation 10)}$$

The value Kp (Kp>0) in Equation 10 is a specific gain for calculating the target accelerator pedal reaction force τ*a from the headway distance deviation ΔL2.

In step S42, which follows step S41, the accelerator pedal actuator is instructed to subject the accelerator pedal 18 to a reaction force corresponding to the target accelerator pedal reaction force τ*a calculated in step S41. Having received this instruction, the accelerator pedal actuator then applies a reaction force corresponding to the target accelerator pedal reaction force τ*a to the accelerator pedal 18. As is clear from Equation 10, the reaction force is applied to the accelerator pedal 18 when the headway distance deviation ΔL2 is positive; i.e., when the headway distance L is less than the headway distance threshold L*2. When the process in step S42 is complete, the process advances to step S16 in the flowchart shown in FIG. 3.

In step S16, a first target deceleration rate α*1 is calculated from Equation 11 based on the first headway distance threshold L*1 calculated in step S12 and based on the headway distance L from the preceding vehicle detected by the headway distance sensor 1.

$$\alpha^*1 = Kv \times Kr1 \times (L^*1 - L) \quad \text{(Equation 11)}$$

The value Kr1 is the gain for calculating the first target deceleration force produced in the host vehicle. The gain Kv is the gain for converting the target deceleration force into the target deceleration rate, and is set in advance based on the host vehicle specifications. The first target deceleration rate α*1 is a positive value during acceleration and a negative value during deceleration.

Figure 26:
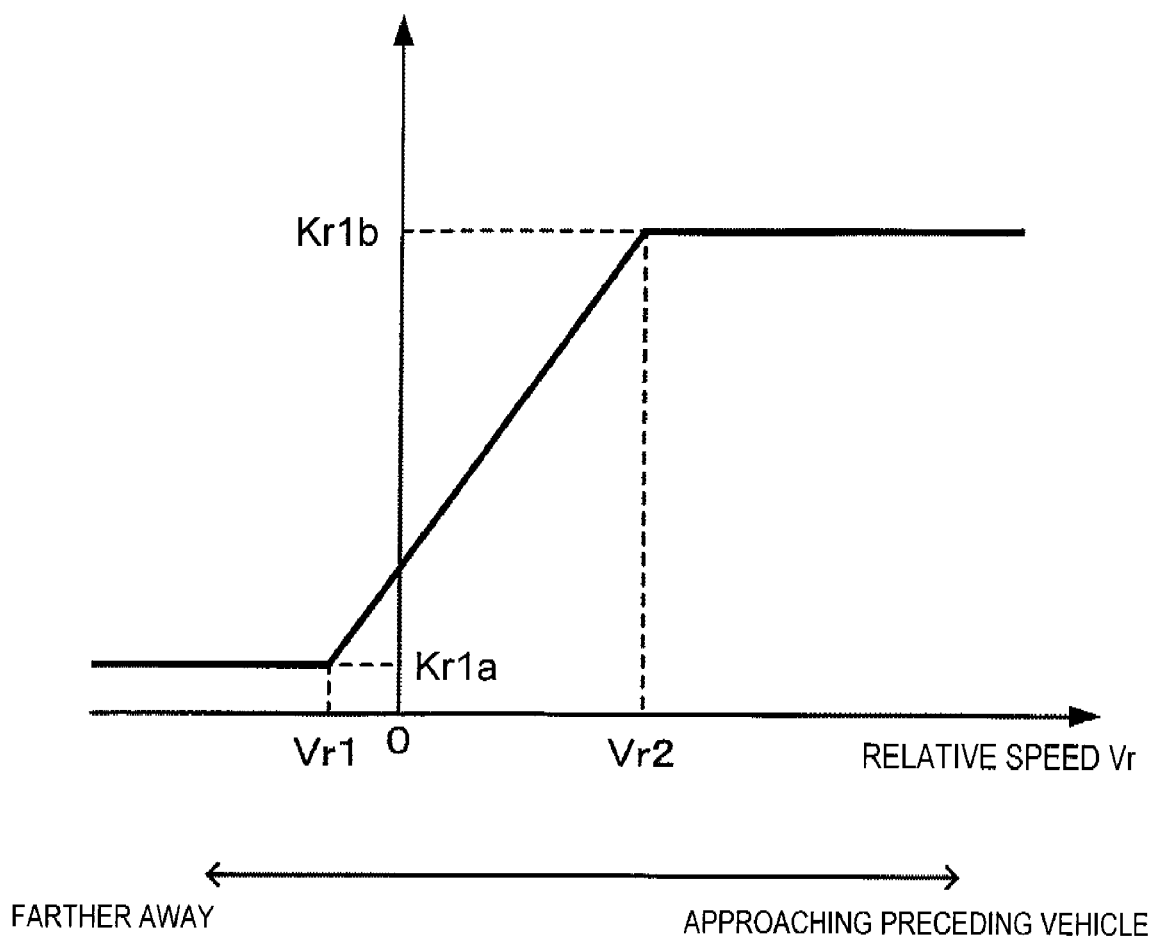
FIG. 26 is a diagram showing the relationship between the relative speed Vr and the gain Kr.

FIG. 26 is a diagram showing the relationship between the relative speed Vr and the gain Kr1. As shown in FIG. 26, the greater the relative speed Vr; i.e., the closer the host vehicle is to the preceding vehicle, the greater the gain Kr1 is; and the smaller the relative speed Vr is, the smaller the gain Kr1 is. When the relative speed Vr is less than a first relative speed Vr1, then the value of the gain Kr1 is set to a first specific gain Kr1a. When the relative speed Vr is greater than a second relative speed Vr2, the value of the gain Kr1 is a second specific gain Kr1b. The table specifying the relationship between relative speed Vr and gain Kr1, as shown in FIG. 26, is stored in advance in the memory (not shown) of the control device 3, and the gain Kr1 is determined based on this table and the relative speed Vr.

As described above, when the accelerator pedal 18 is being depressed (when the accelerator operation flag Facc is "on"), the first target deceleration rate α*1 is 0 because L*1=L. In cases in which the absolute value of the change rate (degree of deceleration) of the first target deceleration rate α*1 calculated from Equation 11 is less than a specific first lower limit Δα*1, the absolute value of the change rate of the first target deceleration rate α*1 is set to the lower limit Δα*1. When the first target deceleration rate α*1 has been calculated, the process advances to step S17.

In step S17, a second target deceleration rate α*2 is calculated from Equation 12, based on the second headway distance threshold L*2 calculated in step S13 and based on the headway distance L from the preceding vehicle detected by the headway distance sensor 1.

$$\alpha^*2 = Kv \times Kr2 \times (L^*2 - L) \quad \text{(Equation 12)}$$

The value Kr2 is the gain for calculating the second target deceleration force produced in the host vehicle, and the value of the second target deceleration rate α*2 when the accelerator pedal 18 is not being depressed (when the accelerator operation flag Facc is "off" and the target drive torque τ*t is set to 0). The second target deceleration rate α*2 is a positive value during acceleration and a negative value during deceleration.

When the absolute value (degree of deceleration) of the rate of change of the second target deceleration rate α*2 calculated from Equation 12 is greater than a specific second upper limit Δα*2 (Δα*2>α*1), the absolute value of the rate of change of the second target deceleration rate α*2 is limited so as to be equal to or less than the upper limit Δα*2. Increasing the second upper limit Δα*2 past the first upper limit Δα*1 moderately controls deceleration when the headway distance L is less than the first headway distance threshold L*1. Deceleration can be controlled to quickly move the vehicle to an appropriate headway distance when the headway distance is less than the second headway distance threshold L*2 (L*2<L*1). When the second target deceleration rate α*2 is calculated, the process advances to step S18.

In step S18, the final target deceleration rate α* produced in the vehicle is determined. In this step, the first target deceleration rate α*1 calculated in step S16 is compared with the second target deceleration rate α*2 calculated in step S17, and the smaller deceleration rate; i.e., the target deceleration having a greater degree of deceleration is set as the final target deceleration rate α*. In this case as well, the final target deceleration rate α* is a positive value during acceleration and a negative value during deceleration.

In step S19, which follows step S18, braking is controlled based on the final target deceleration rate α*. First, as shown in Equation 13, a target deceleration rate α*brk produced by the brakes is calculated by subtracting a deceleration rate α*eng produced by engine braking from the final target deceleration rate α* determined in step S18.

$$\alpha^*brk = \alpha^* - \alpha^*eng \quad \text{(Equation 13)}$$

The values α*, α*brk, and α*eng are all positive during acceleration and negative during deceleration. When the accelerator pedal 18 is being depressed (when the accelerator operation flag Facc is "on"), α*brk=0 because α*=α*eng=0.

Next, a target brake fluid pressure P* is calculated from Equation 14 based on the calculated target deceleration rate α*brk.

$$P^* = -(Kb \times \alpha^*brk) \quad \text{(Equation 14)}$$

The value Kb is the gain for converting the target deceleration rate into a target brake fluid pressure, and is set in advance based on the host vehicle specifications. When the accelerator pedal 18 is being depressed (when the accelerator operation flag Facc is "on"), P*=0 because α*brk=0.

The deceleration control device 5 is then instructed to create a brake fluid pressure based on the calculated target brake fluid pressure P*. Having received this instruction, the deceleration control device 5 creates a brake fluid pressure based on the target brake fluid pressure P*, and supplies the brake fluid pressure to the wheel cylinders (not shown) of the hydraulic brakes 5a provided to the wheels. Control for decelerating the vehicle is thereby implemented if the driver is not operating the accelerator pedal 18 when the headway distance L is less than both the first headway distance threshold L*1 and the second headway distance threshold L*2. When the driver is operating the accelerator pedal 18, deceleration control is not implemented because the target brake fluid pressure P*=0.

Upon being completed in step S19, the process returns to step S11. The processes in steps S11 through S19 are thereafter repeated.

Thus, although the tracking control system and the headway distance control system implement different controls, these systems have the common function of decelerating the vehicle according to the headway distance from the preceding vehicle when their operations are turned "on" according to the intentions of the driver. When these systems are operating simultaneously, it is possible that the driver may confuse the control specifics and control factors of the systems.

In view of this, in the headway maintenance assist system according to the first embodiment, the tracking control system and the headway distance control system are not operated simultaneously. Operating the switches by the driver is equivalent to selecting an operation according to the intentions of the driver.

FIG. 7 shows the manner in which the state transition is made between the tracking control system and the headway distance control system according to the switches operated by the driver. When the main switch 8 is operated while the tracking control system and the headway distance control system are both "off", the tracking control system turns "on" but remains in standby mode in which control is not implemented (state transition A). When the main switch 8 is turned "off" in this state, the tracking control system is turned "off" (state transition B). When the set/coast switch 9 is operated while the tracking control system is in standby mode, the tracking control system operates (state transition C). When the cancel switch 11 is operated while the tracking control system is operating, the tracking control system goes into standby mode (state transition D). When the main switch 8 is turned "off" while the tracking control system is in standby mode, the tracking control system is turned "off" (state transition E).

When the operating switch 13 is operated while the tracking control system and the headway distance control system are both turned "off", the headway distance control system turns "on" (state transition F). When the operating switch 13 is turned "off" while the headway distance control system is "on", the headway distance control system turns "off" (state transition G). Thus, the configuration does not make it possible for the driver to turn "on" the tracking control system (either in standby or operating mode) and the headway distance control system at the same time by operating the switches.

Figure 8:
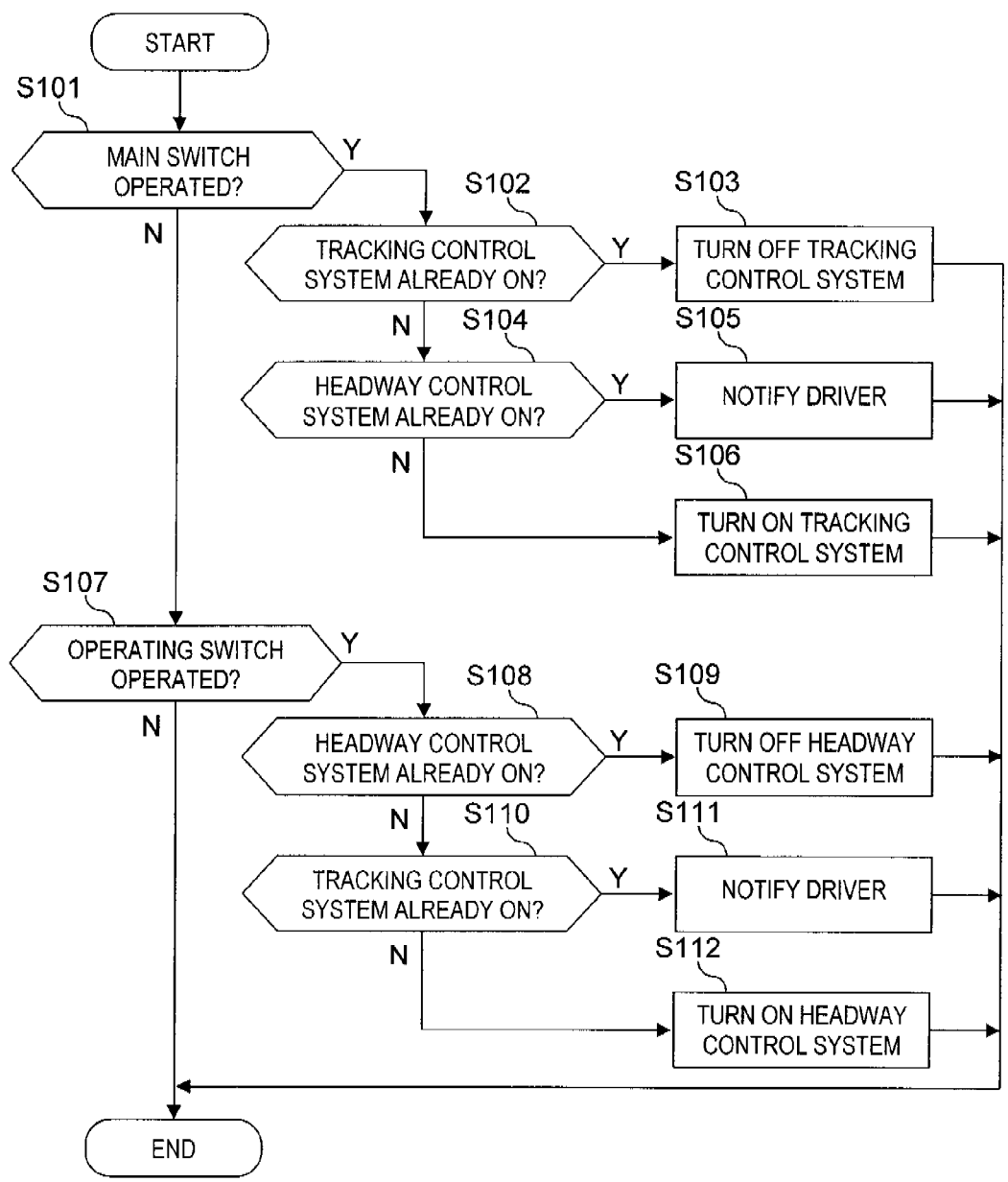
FIG. 8 is a flowchart showing the sequence executed by the control unit for carrying out the state transition process in the tracking control system and headway distance control system.

The following is a detailed description, made with reference to FIG. 8, of the manner in which state transitions are made between the tracking control system and the headway distance control system according to the driver's operation of the switches. FIG. 8 is a flowchart of the sequence for carrying out the state transition process in the control device 3 of the first embodiment. This process is repeated at constant intervals.

Figure 9:
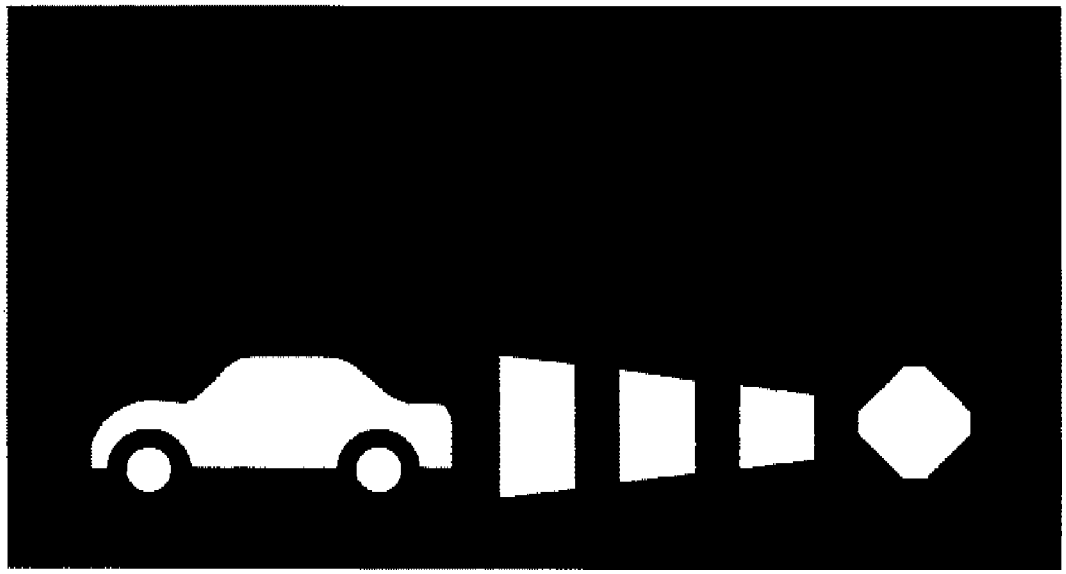
FIG. 9 is an example of a display showing the operational state of the tracking control system.

In step S101, a determination is made as to whether the main switch 8 has been operated. The determination to whether the main switch 8 has been operated is made regardless of whether an on operation or an "off" operation is involved. In cases in which the main switch 8 has been operated, the process advances to step S102, and a determination is made as to whether the tracking control system is already "on". In cases in which the tracking control system is "on"; i.e., is in standby mode or operating mode, the process advances to step S103, and the tracking control system is turned "off" (state transition B or E). When the tracking control system is in operating mode, an operating display for the tracking control system, such as is shown in FIG. 9, is displayed on the display device 6.

If the tracking control system is determined to be "off" in step S102, the process advances to step S104. In step S104, a determination is made as to whether the headway distance control system is already "on". In cases in which the headway distance control system is "on", the process advances to step S105, and the notification device 7 is instructed to notify the driver that the tracking control system cannot be turned "on". The notification device 7 produces an audible notification such as a beep, for example. Specifically, in cases in which the headway distance control system is "on", an audible notification is produced to inform the driver because the tracking control system cannot be turned "on" even if the main switch 8 is operated.

In cases in which the headway distance control system is "off"; i.e., the main switch 8 is turned "on" while the tracking control system and the headway distance control system are both "off", the process advances to step S106 and the tracking control system is turned "on" (state transition A).

When it is determined in step S101 that the main switch 8 has not been operated, the process advances to step S107, and a determination is made as to whether the operating switch 13 has been operated. It is determined whether the operating switch 13 has been operated regardless of whether it has been turned "on" or "off". In cases in which the operating switch 13 has been operated, the process advances to step S108, and a determination is made as to whether the headway distance control system has already been turned "on". In cases in which the headway distance control system is "on", the process advances to step S109, and the headway distance control system is turned "off" (state transition G).

A determination is made in step S108 as to whether the headway distance control system is "off", and the process advances to step S110. In step S110, a determination is made as to whether the tracking control system is already "on". In cases in which the tracking control system is "on", the process advances to step S111, and the notification device 7 is instructed to notify the driver that the headway distance control system cannot be turned "on". The notification device 7 produces an audible notification such as a beep, for example, according to the instruction from the control device 3. Specifically, in cases in which the tracking control system is "on", an audible notification is produced to inform the driver because the headway distance control system cannot be turned "on" even if the operating switch 13 is turned "on".

Figure 10:
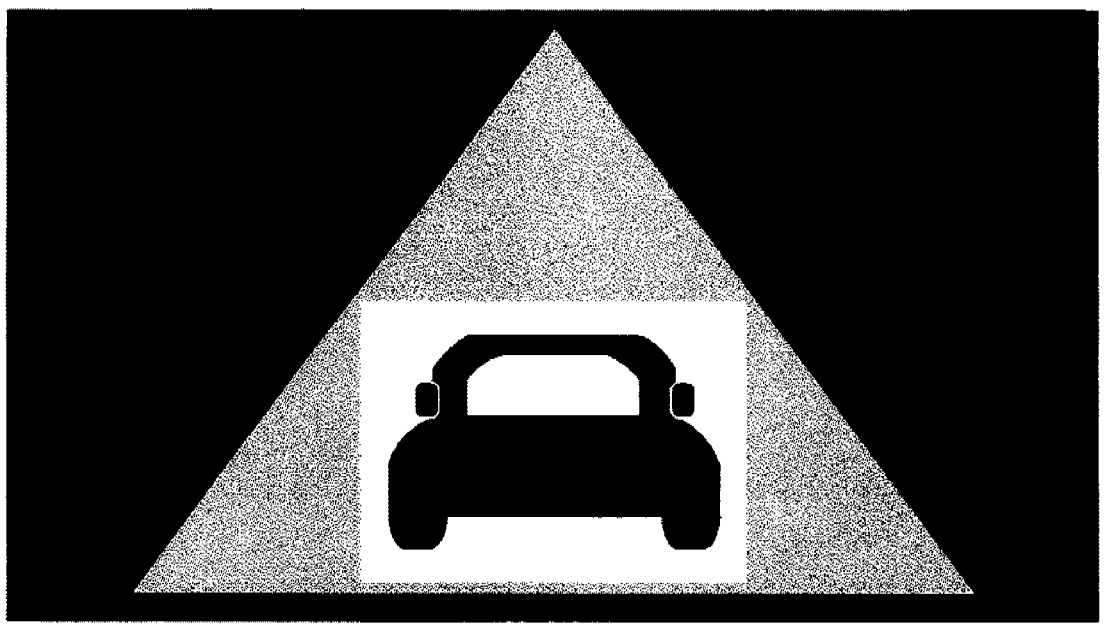
FIG. 10 is an example of a display showing the operational state of the headway distance control system.

In cases in which the tracking control system is "off"; i.e., the operating switch 13 is turned "on" while the tracking control system and the headway distance control system are both "off", the process advances to step S112 and the headway distance control system is turned "on" (state transition F). When the headway distance control system is "on", an operating display for the headway distance control system, such as is shown in FIG. 10, is displayed on the display device 6. The current process is thereby complete.

In the flowchart shown in FIG. 8, the state transitions corresponding to the operations of the main switch 8 and operating switch 13 were described in detail. The state transitions corresponding to the operations of the set/coast switch 9 and the cancel switch 11 are as shown in FIG. 7, and detailed descriptions are therefore omitted.

Thus, the following operational effects can be achieved in the first embodiment described above.

(1) The headway maintenance assist system comprises a tracking control system for controlling the deceleration of the host vehicle (for controlling the process of following the preceding vehicle) according to the headway distance between the host vehicle and the preceding vehicle, and a headway distance control system for controlling the deceleration of the host vehicle (for controlling the headway distance), which is different from controlling the process of following the preceding vehicle according to the headway distance. The apparatus furthermore comprises operating switches 8 through 13 that are operated in order to enable or disable operation of the tracking control system and headway distance control system. The control device 3 is configured to ensure that the tracking control system and the headway distance control system do not operate simultaneously. It is thereby possible to prevent situations in which multiple controls functioning to decelerate the vehicle according to headway distance are operated simultaneously, and the driver misinterprets the control specifics or control factors of the system currently operating.

(2) The control device 3 ensures that the tracking control system and the headway distance control system cannot be selected to operate simultaneously. Specifically, when one system is operating, the operation of the other system cannot be selected by operating the operating switches 8 through 13. It is thereby possible to prevent the driver from misinterpreting the control specifics or control factors of the system currently operating.

(3) The control device 3 enables either operation to be selected by the operating switches 8 through 13 only when neither the tracking control system nor the headway distance control system is operating. It is thereby possible to prevent situations in which the control specifics or control factors of the selected system are misinterpreted.

(4) If the operation of a system selected from the tracking control system and the headway distance control system is selected by the operating switches 8 through 13 while the other system is operating, the control device 3 informs the driver through the notification device 7 that the selection cannot be made. It is thereby possible to prevent the driver from misinterpreting the currently operating system.

Second Embodiment

Figure 11:
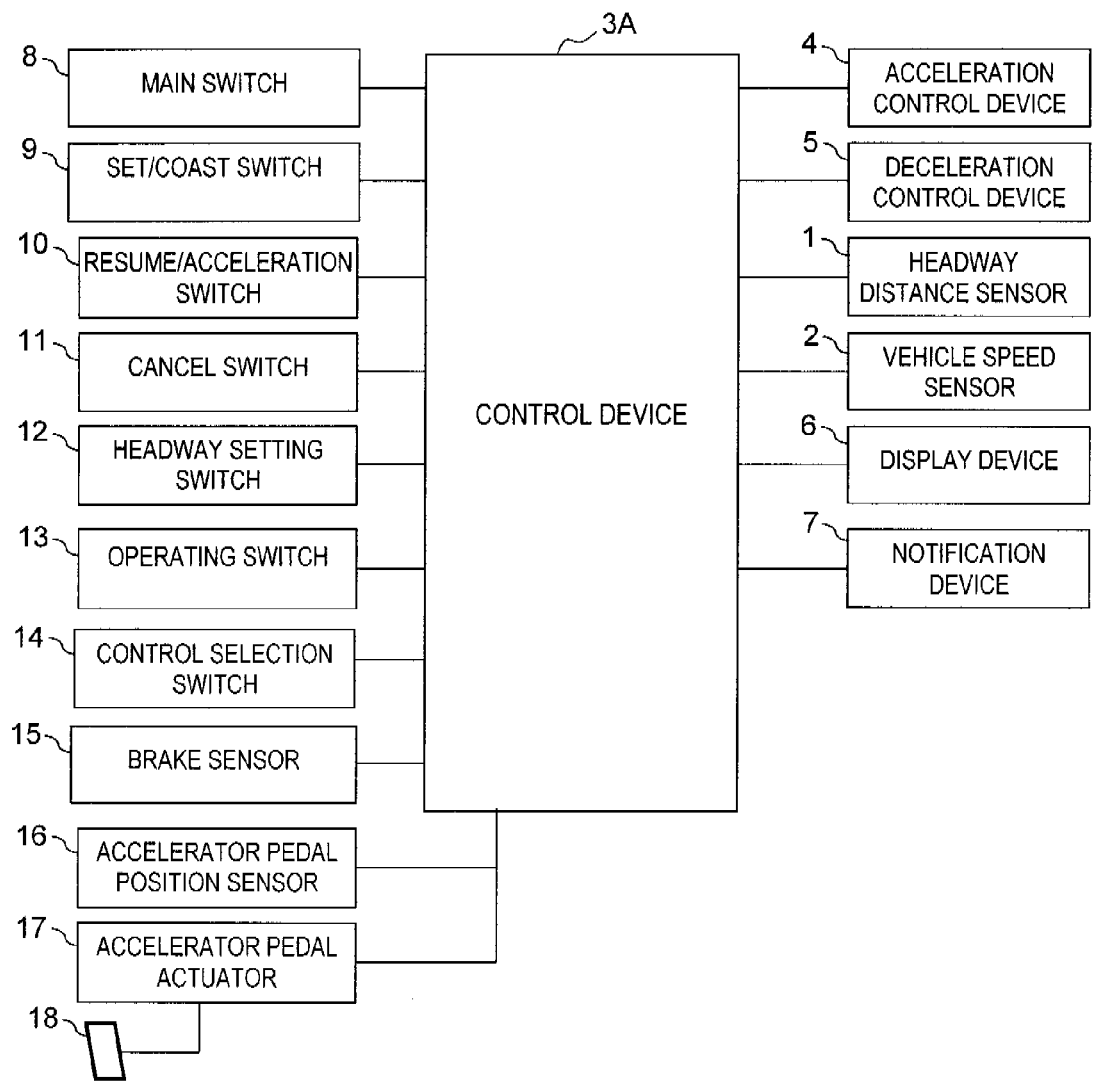
FIG. 11 is a block diagram showing the configuration of the headway maintenance assist system having a vehicle headway distance control apparatus according to the second embodiment of the present invention.

The following is a description of the headway maintenance assist system according to the second embodiment of the present invention. FIG. 11 shows a block diagram of the headway maintenance assist system according to the second embodiment. In FIG. 11, the same symbols are used to denote components having the same functions as those in the first embodiment shown in FIG. 1. The differences with the first embodiment described above are primarily described herein.

The headway maintenance assist system according to the second embodiment allows the driver to turn both the tracking control system and the headway distance control system "on" by operating the switches. However, this apparatus is designed to operate while giving priority to the control of either one of the systems selected by the driver.

In view of this, the headway maintenance assist system according to the second embodiment further comprises a control selection switch 14 and a brake sensor 15. The control selection switch 14 is a switch for setting which system control will be given priority when both the tracking control system and the headway distance control system are "on". The control selection switch 14 is provided to a location on the steering wheel where the switch can be easily operated by the driver, similar to the other operating switches. The brake sensor 15 senses that a brake pedal (not shown) has been operated by the driver.

FIG. 12 shows the states of the tracking control system and the headway distance control system that the driver can select by operating the switches. The states shown in FIG. 12 represent states that are set by operating the switches (switch set states), and the operations of the tracking control system and headway distance control system in each state are described later.

A state in which both the tracking control system and headway distance control system are "off" is defined as state 1. A state in which the tracking control system is in standby mode and the headway distance control system is "off" is defined as state 2. A state in which the tracking control system is operational and the headway distance control system is "off" is defined as state 3. A state in which the tracking control system is "off" and the headway distance control system is "on" is defined as state 4. A state in which the tracking control system is in standby mode and the headway distance control system is "on" is defined as state 5. A state in which the tracking control system is operational and the headway distance control system is "on" is defined as state 6.

States 5 and 6 are states in which the tracking control system and the headway distance control system are both turned "on" by the driver operating the switches. Since priority is given to the control of the system selected by the control selection switch 14 in states 5 and 6, the driver is notified when the system operated by the switches is changed.

Figure 13:
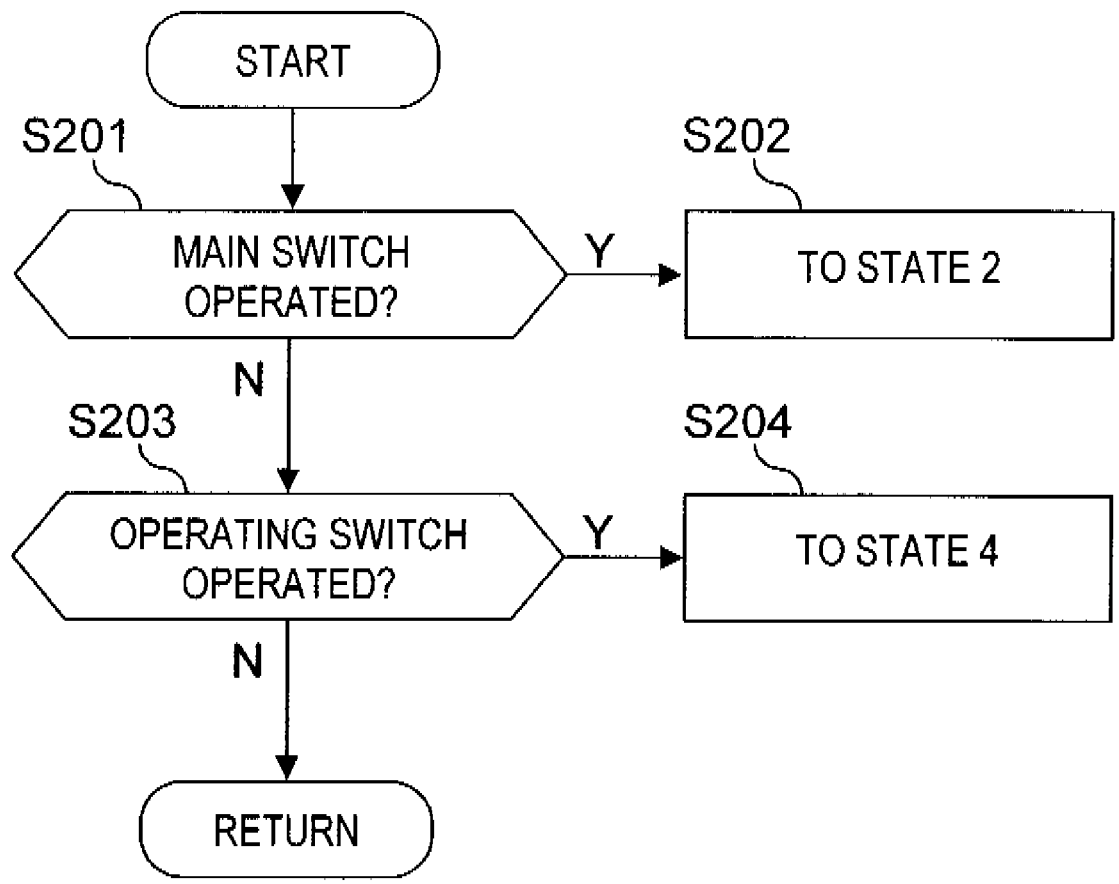
FIG. 13 is a flowchart showing the sequence executed by the control unit for carrying out the state transition process when the systems are in state 1.

The following is a description of the operation of making a state transition between the states of the tracking control system and the headway distance control system corresponding to the switches operated by the driver. First, the state transition operation in state 1 will be described using the flowchart in FIG. 13. FIG. 13 is a flowchart of the sequence involved is performing the state transition process in state 1 implemented by the control device 3A in the second embodiment.

A determination is made as to whether the main switch 8 has been operated in step S201. In cases in which the main switch 8 has been operated, the process advances to step S202 and state 2 goes into effect. In cases in which the main switch 8 has not been operated, the process advances to step S203, and a determination is made as to whether the operating switch 13 has been operated. In cases in which the operating switch 13 has been operated, the process advances to S204 and state 4 goes into effect. In cases in which the operating switch 13 has not been operated, state 1 stays in effect and the process is complete.

Figure 14:
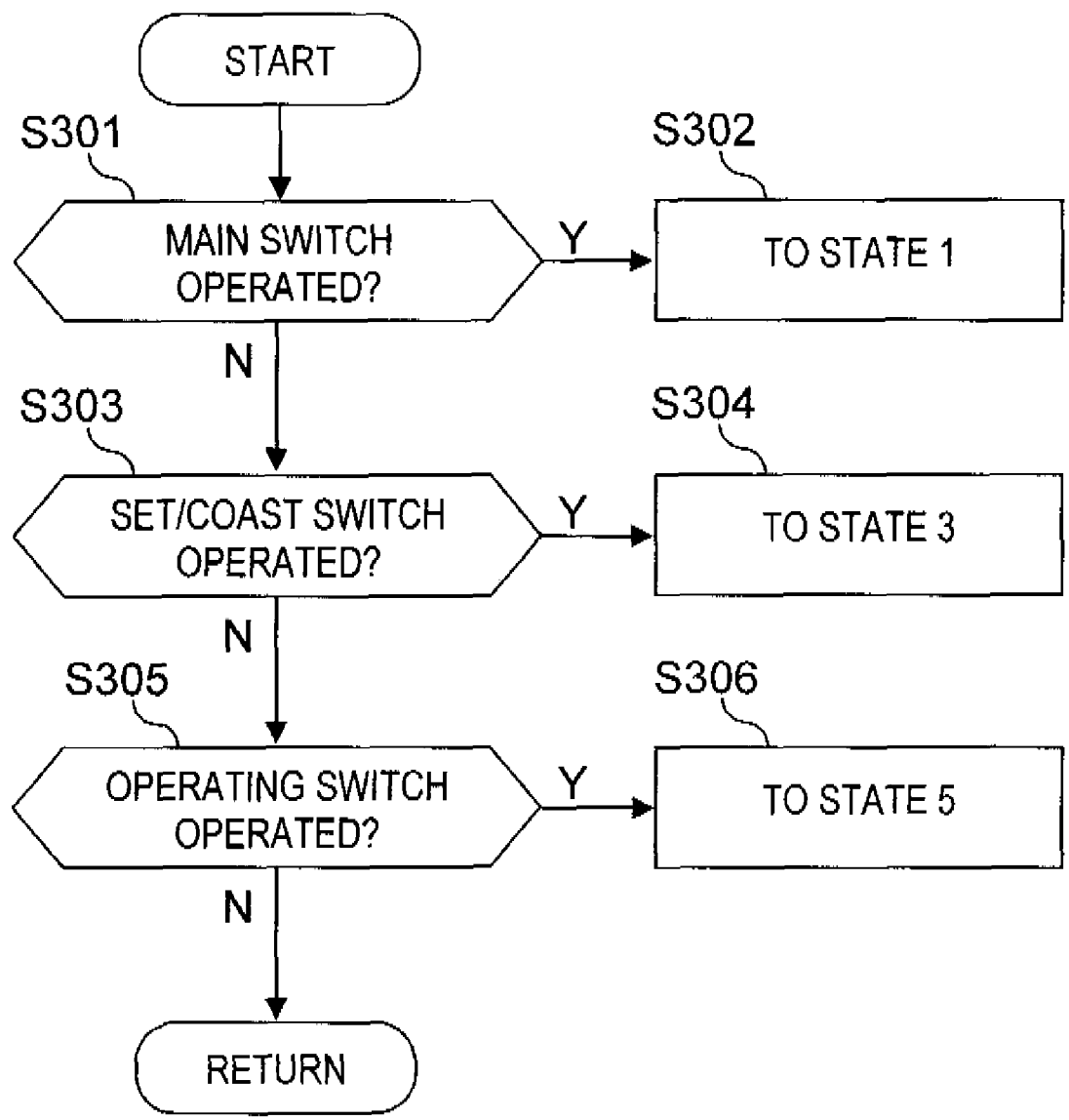
FIG. 14 is a flowchart showing the sequence executed by the control unit for carrying out the state transition process when the systems are in state 2.

FIG. 14 shows a flowchart of the sequence for carrying out the state transition process in state 2 implemented by the control device 3A. In state 2, the tracking control system is in standby mode and the headway distance control system is "off", and neither system is operating.

A determination is made in step S301 as to whether the main switch 8 has been operated. In cases in which the main switch 8 has been operated, the process advances to step S302 and state 1 goes into effect. In cases in which the main switch 8 has not been operated, the process advances to step S303, and a determination is made as to whether the set/coast switch 9 has been operated. In cases in which the set/coast switch 9 has been operated, the process advances to step S304 and state 3 goes into effect.

In cases in which the set/coast switch 9 has not been operated, the process advances to step S305, and a determination is made as to whether the operating switch 13 has been operated. In cases in which the operating switch 13 has been operated, the process advances to step S306 and state 5 goes into effect. In cases in which a state transition is made from state 2 to state 5, the headway distance control system is turned "on" while the tracking control system is in standby mode. In cases in which the operating switch 13 has not been operated, state 2 stays in effect and the process is complete.

Figure 15:
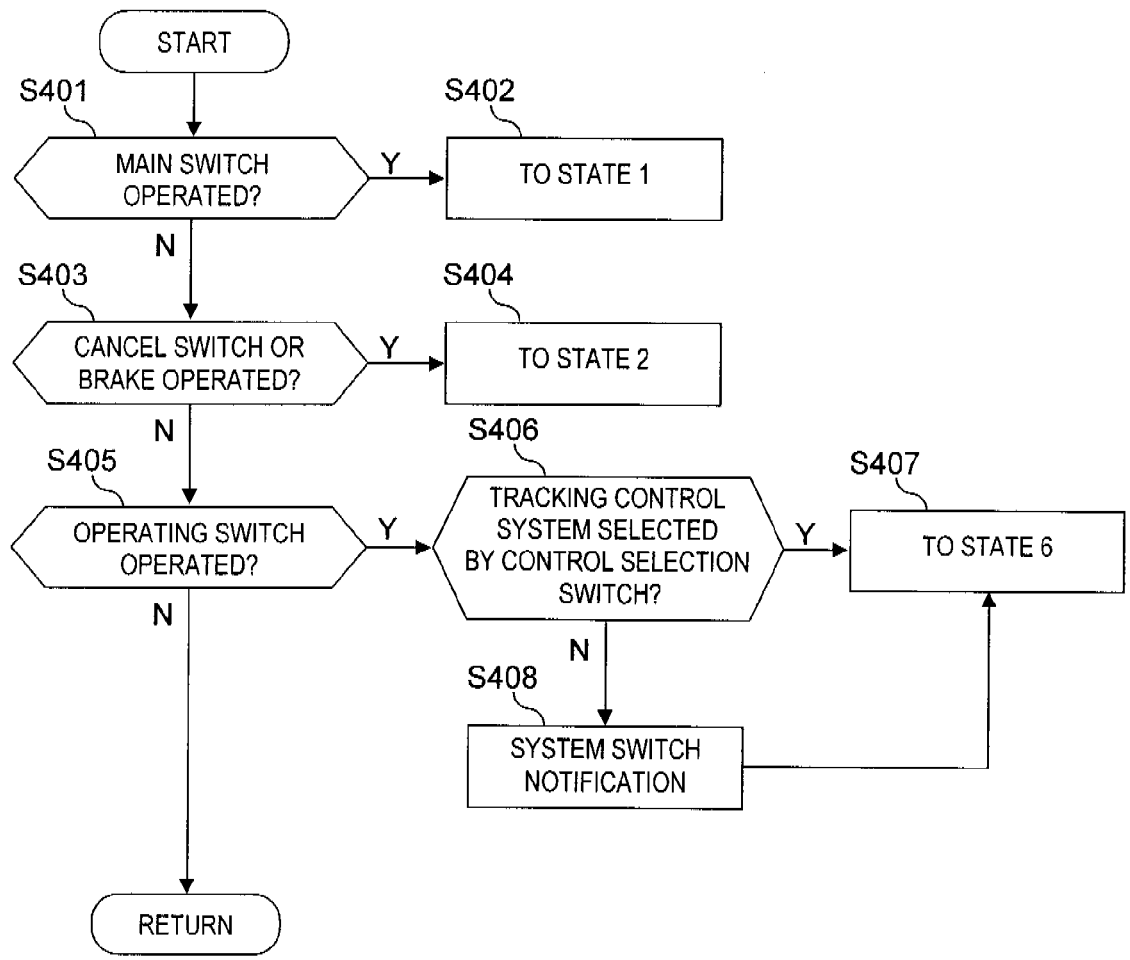
FIG. 15 is a flowchart showing the sequence executed by the control unit for carrying out the state transition process when the systems are in state 3.

FIG. 15 shows a flowchart of the sequence for carrying out the state transition process in state 3 implemented by the control device 3A. In state 3, the headway distance control system is "off" while the tracking control system is operating.

A determination is made in step S401 as to whether the main switch 8 has been operated. In cases in which the main switch 8 has been operated, the process advances to step S402 and state 1 goes into effect. In cases in which the main switch 8 has not been operated, the process advances to step S403, and it is determined whether or not the cancel switch 11 has been operated, or whether or not an operation of the brake pedal has been detected by the brake sensor 15. In cases in which either the cancel switch 11 or the brake pedal has been operated, the process advances to step S404 and state 2 goes into effect.

In cases in which neither the cancel switch 11 nor brake pedal has been operated, the process advances to step S405, and a determination is made as to whether the operating switch 13 has been operated. In cases in which the operating switch 13 has been operated, the process advances to step S406, and a determination is made as to whether the tracking control system has been selected in advance by the control selection switch 14. In cases in which the tracking control system has been selected, the process advances to step S407 and state 6 goes into effect. In this case, only the tracking control system implements control even if state 6 goes into effect, because the setting gives priority to control by the tracking control system.

When it is determined in step S406 that the tracking control system has not been selected, the process advances to step S408. In step S408, the notification device 7 is instructed to notify the driver that control will switch from the tracking control system to the headway distance control system. The notification device 7 produces an audible notification such as a beep, for example, according to the instruction from the control device 3A. The process then advances to step S407 and state 6 goes into effect. When it is determined in step S405 that the operating switch 13 has not been operated, state 3 stays in effect and the process is complete.

Figure 16:
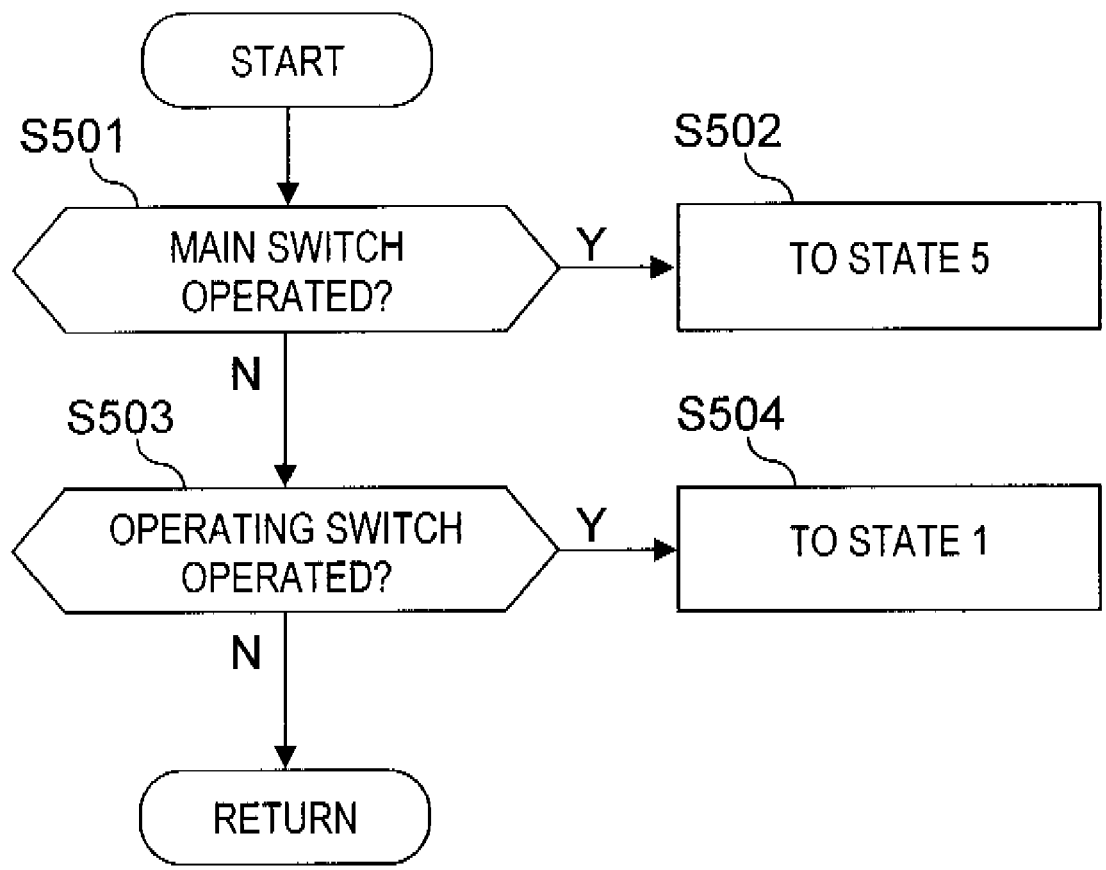
FIG. 16 is a flowchart showing the sequence executed by the control unit for carrying out the state transition process when the systems are in state 4.

FIG. 16 shows a flowchart of the sequence for carrying out the state transition process in state 4 implemented by the control device 3A. In state 4, the headway distance control system is operating while the tracking control system is "off".

A determination is made in step S501 as to whether the main switch 8 has been operated. In cases in which the main switch 8 has been operated, the process advances to step S502 and state 5 goes into effect. When a state transition is made from state 4 to state 5, the tracking control system goes into standby mode while the headway distance control system stays "on". In cases in which the main switch 8 has not been operated, the process advances to step S503, and a determination is made as to whether the operating switch 13 has been operated. In cases in which the operating switch 13 has been operated, the process advances to step S504 and state 1 goes into effect. In cases in which the operating switch 13 has not been operated, state 4 stays in effect and the process is complete.

Figure 17:
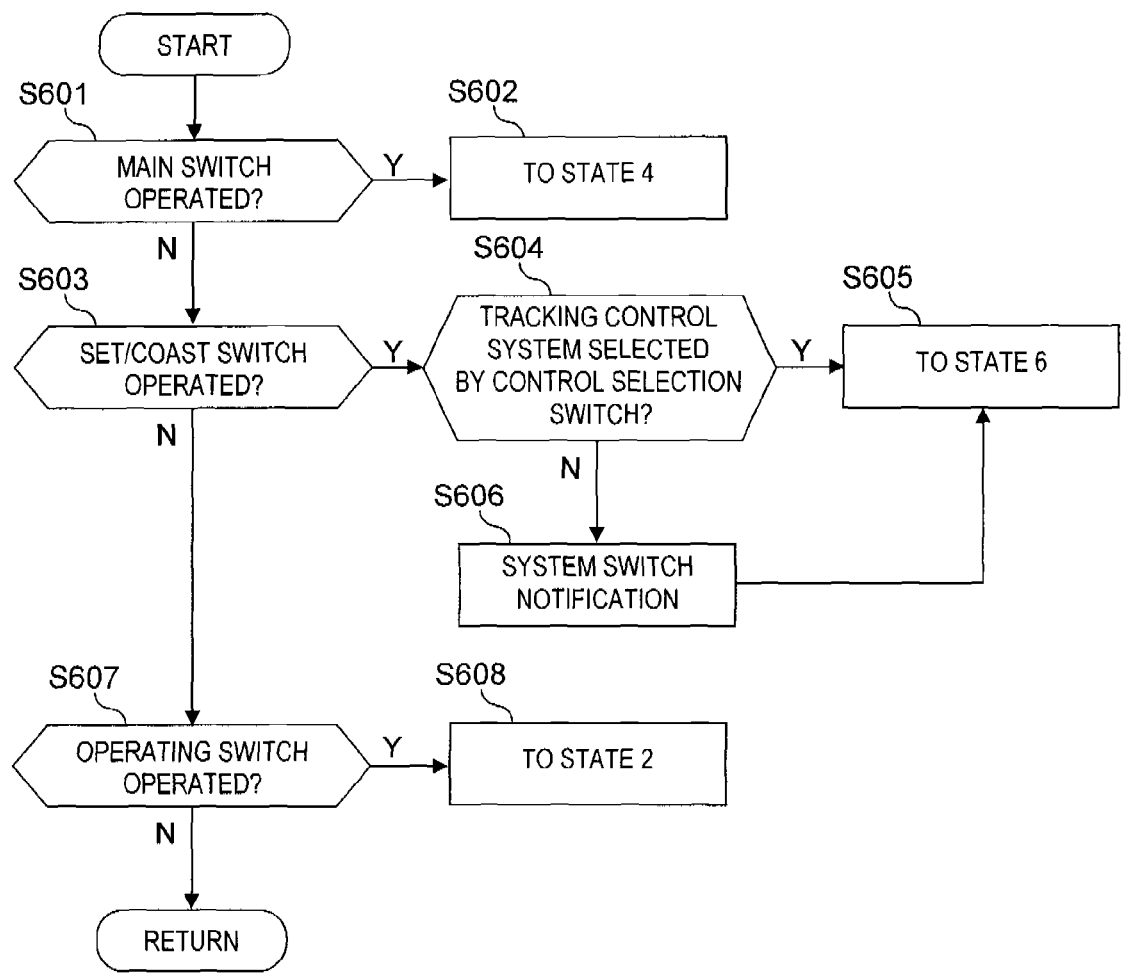
FIG. 17 is a flowchart showing the sequence executed by the control unit for carrying out the state transition process when the systems are in state 5.

FIG. 17 shows a flowchart of the sequence for carrying out the state transition process in state 5 implemented by the control device 3A. In state 5, the headway distance control system is operating while the tracking control system is in standby mode.

A determination is made in step S601 as to whether or not the main switch 8 has been operated. In cases in which the main switch 8 has been operated, the process advances to step S602 and state 4 goes into effect. In cases in which the main switch 8 has not been operated, the process advances to step S603, and a determination is made as to whether the set/coast switch 9 has been operated.

In cases in which the set/coast switch 9 has been operated, the process advances to step S604, and a determination is made as to whether the headway distance control system has been selected in advance by the control selection switch 14. In cases in which the headway distance control system has been selected, the process advances to step S605 and state 6 goes into effect. In this case, only the headway distance control system implements control even if state 6 goes into effect, because the setting gives priority to control by the headway distance control system.

If it is determined in step S604 that the headway distance control system has not been selected, the process advances to step S606. In step S606, the notification device 7 is instructed to notify the driver that control will switch from the headway distance control system to the tracking control system. The notification device 7 produces an audible notification such as a beep, for example, according to the instruction from the control device 3A. The process then advances to step S605 and state 6 goes into effect.

If it is determined in step S603 that the set/coast switch 9 has not been operated, the process advances to step S607, and a determination is made as to whether the operating switch 13 has been operated. In cases in which the operating switch 13 has been operated, the process advances to step S608 and state 2 goes into effect. In cases in which the operating switch 13 has not been operated, state 5 stays in effect and the process is complete.

Figure 18:
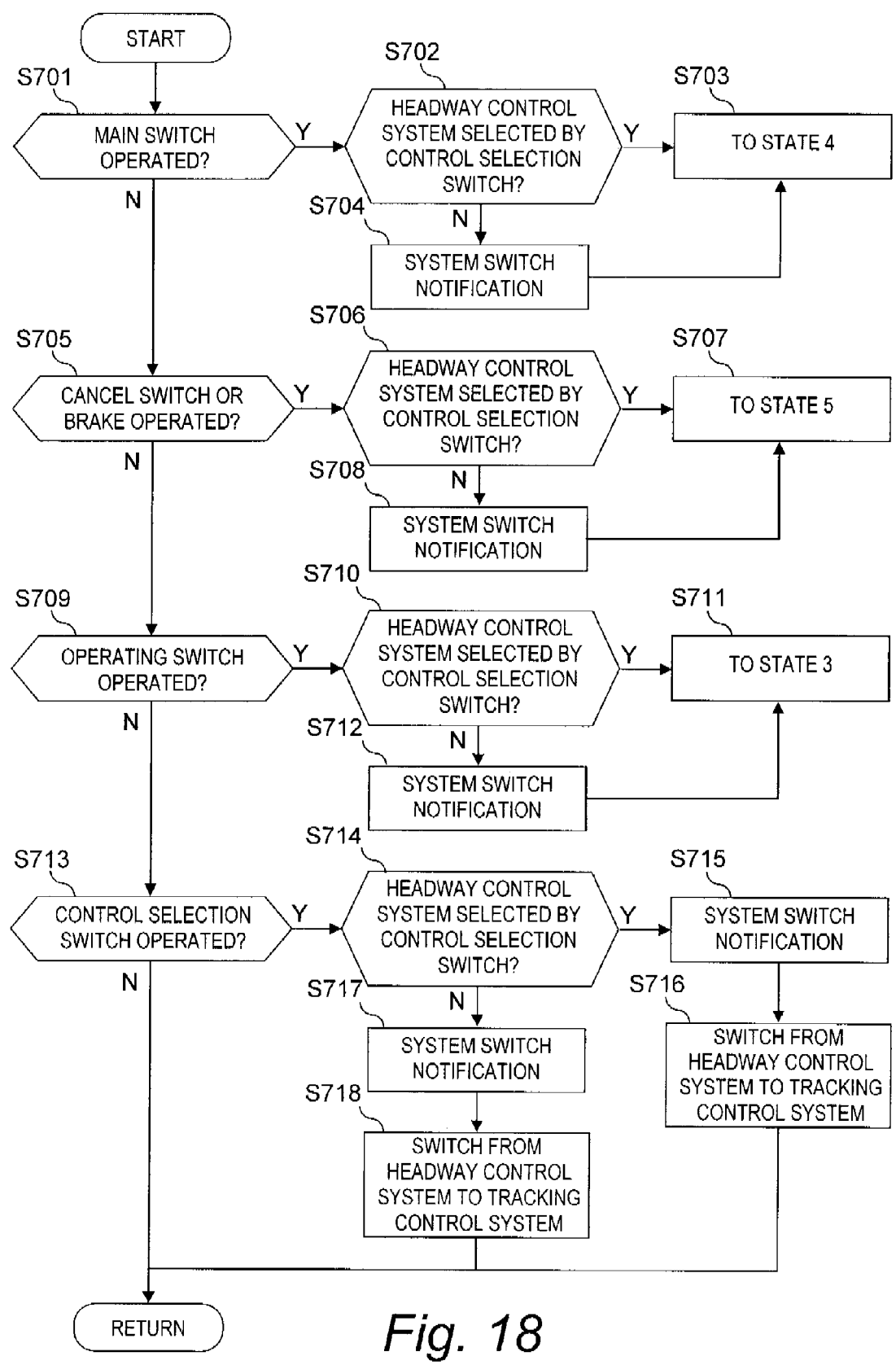
FIG. 18 is a flowchart showing the sequence executed by the control unit for carrying out the state transition process when the systems are in state 6.

FIG. 18 shows a flowchart of the sequence for carrying out the state transition process in state 6 implemented by the control device 3A. In state 6, the tracking control system and headway distance control system are both "on", and either of the systems selected by the control selection switch 14 is operating.

A determination is made in step S701 as to whether the main switch 8 has been operated. In cases in which the main switch 8 has been operated, the process advances to step S702, and a determination is made as to whether the headway distance control system has been selected in advance by the control selection switch 14. In cases in which the headway distance control system has been selected, the process advances to step S703 and state 4 goes into effect. In cases in which the headway distance control system has not been selected in step S702; i.e., the tracking control system has been selected, the process advances to step S704. In step S704, the notification device 7 is instructed to notify the driver that control will switch from the tracking control system to the headway distance control system. The notification device 7 produces an audible notification such as a beep, for example, according to the instruction from the control device 3A. The process then advances to step S703 and state 4 goes into effect.

If it is determined in step S701 that the main switch 8 has not been operated, the process advances to step S705. In step S705, a determination is made as to whether the cancel switch 11 has been operated, or whether operation of the brake pedal has been detected by the brake sensor 15. In cases in which the cancel switch 11 or the brake pedal has been operated, the process advances to step S706, and a determination is made as to whether the headway distance control system has been selected in advance by the control selection switch 14.

In cases in which the headway distance control system is selected, the process advances to step S707 and state 5 goes into effect. If it is determined in step S706 that the headway distance control system has not been selected, the process advances to step S708. In step S708, the notification device 7 is instructed to notify the driver that control will switch from the tracking control system to the headway distance control system. The notification device 7 produces an audible notification such as a beep, for example, according to the instruction from the control device 3A. The process then advances to step S707 and state 5 goes into effect.

If it is determined in step S705 that neither the cancel switch 11 nor the brake pedal has been operated, the process advances to step S709, and a determination is made as to whether the operating switch 13 has been operated. In cases in which the operating switch 13 has been operated, the process advances to step S710, and a determination is made as to whether the tracking control system has been selected in advance by the control selection switch 14. In cases in which the tracking control system has been selected, the process advances to step S711 and state 3 goes into effect.

If it is determined in step S710 that the tracking control system has been selected, the process advances to step S712. In step S712, the notification device 7 is instructed to notify the driver that control will switch from the headway distance control system to the tracking control system. The notification device 7 produces an audible notification such as a beep, for example, according to the instruction from the control device 3A. The process then advances to step S711 and state 3 goes into effect.

In cases in which it is determined in step S709 that the operating switch 13 has not been operated, the process advances to step S713, and a determination is made as to whether the control selection switch 14 has been operated. In cases in which the control selection switch 14 has been operated, the process advances to step S714. In step S714, a determination is made as to whether the tracking control system has been selected before the control selection switch 14 has been operated. In cases in which the tracking control system has been selected, the process advances to step S715, and the notification device 7 is instructed to notify the driver that control will switch from the tracking control system to the headway distance control system. The notification device 7 produces an audible notification such as a beep, for example, according to the instruction from the control device 3A.

Figure 19:
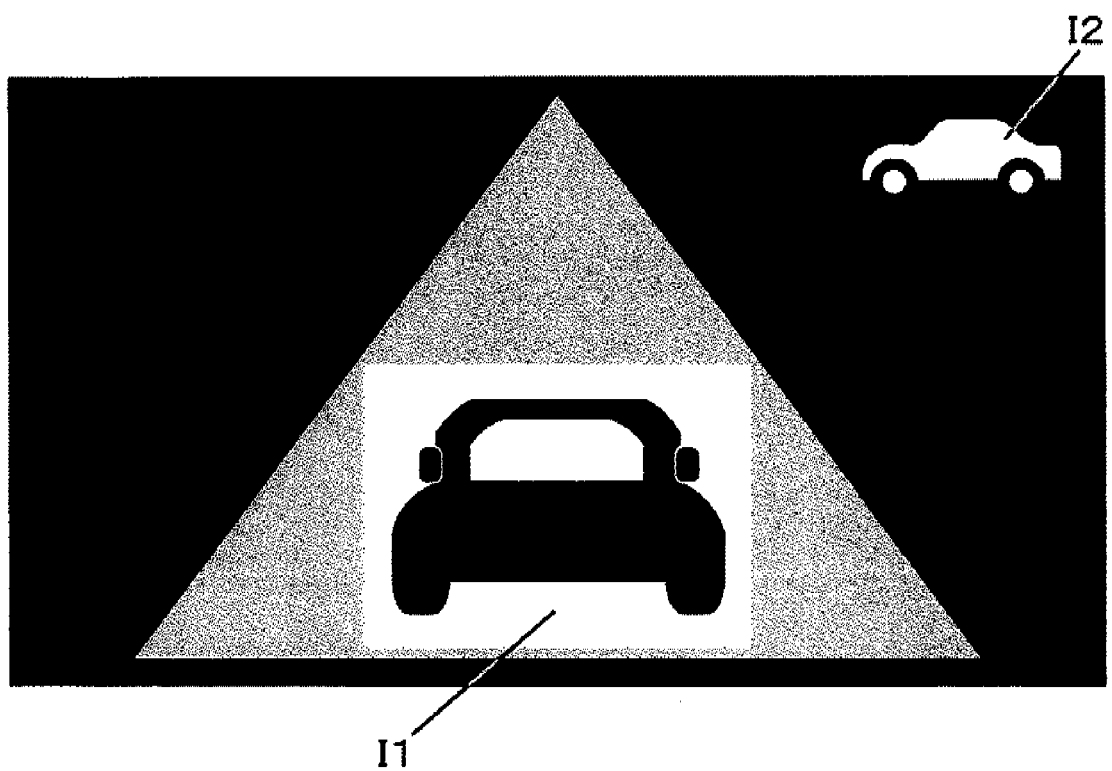
FIG. 19 is an example of a display in a case in which the headway distance control system has been selected when the systems are in state 6.

The process then advances to step S716, and control switches from the tracking control system to the headway distance control system while state 6 stays in effect. The control device 3A outputs an instruction to the notification device 7 at this time, and the display indicates that the headway distance control system has been selected, as shown in FIG. 19. An image I1 is displayed in the center of FIG. 19, showing the headway distance control system selected to operate, and a reduced image I2 is displayed in the upper right, showing the tracking control system that is operational but that has not been selected to operate.

If it is determined in step S714 that the tracking control system has not been selected before the control selection switch 14 has been operated, the process advances to step S717, and the notification device 7 is instructed to notify the driver that control will switch from the headway distance control system to the tracking control system. The notification device 7 produces an audible notification such as a beep, for example, according to the instruction from the control device 3A.

Figure 20:
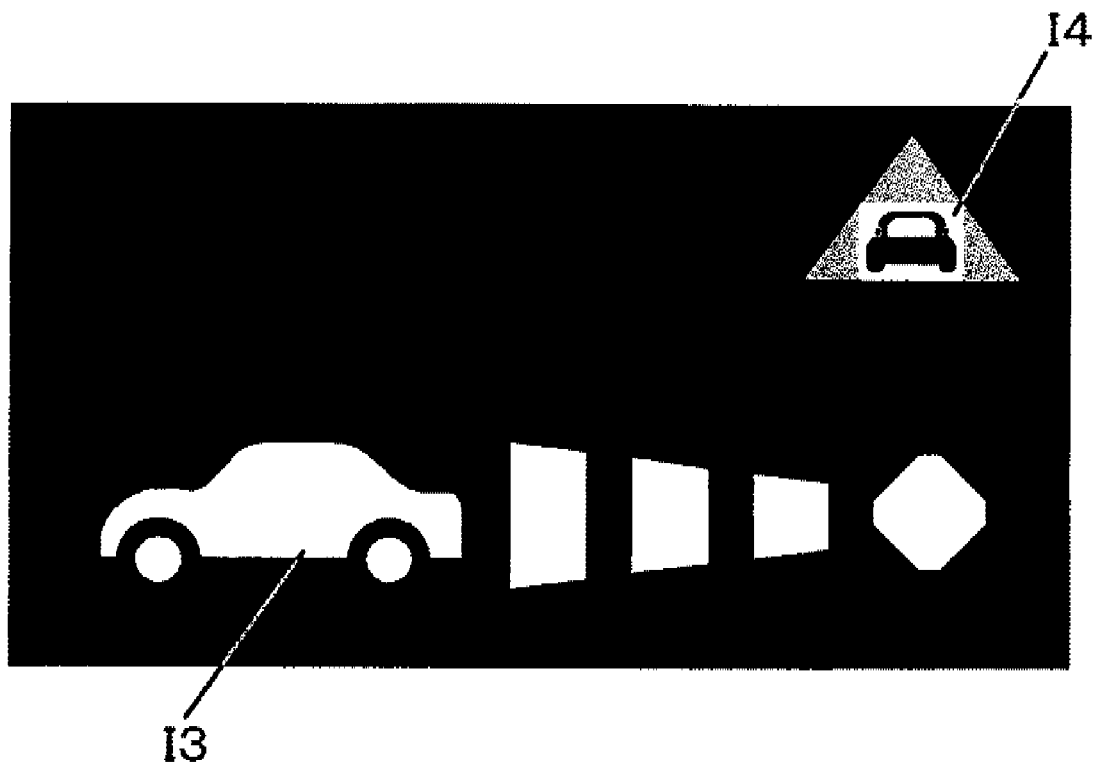
FIG. 20 is an example of a display in a case in which the tracking control system has been selected when the systems are in state 6.

The process then advances to step S718, and control switches from the headway distance control system to the tracking control system while state 6 stays in effect. The control device 3A outputs an instruction to the notification device 7 at this time, and the display indicates that the tracking control system has been selected, as shown in FIG. 20. An image I3 is displayed in the center of FIG. 20, showing the tracking control system selected to operate, and a reduced image I4 is displayed in the upper right, showing the headway distance control system that is operational but that has not been selected to operate. The process is thereby complete.

While state 6 is in effect, the display device 6 constantly shows the display shown in FIG. 19 or 20 in accordance with the system that has been selected. When only the tracking control system is operational (state 3), or when only the headway distance control system is operational (state 4 and 5), the display device 6 shows the display in FIG. 9 or 10, similar to the first embodiment described above.

Thus, in the second embodiment described above, the following operational effects are achieved in addition to the effects of the first embodiment.

(1) The control device 3A permits only one of the systems to operate when the tracking control system and headway distance control system are selected simultaneously by the operating switches 8 through 13. It is thereby possible to prevent the driver from misinterpreting the control specifics or control factors of the system currently operating.

(2) The headway maintenance assist system further comprises a control selection switch 14 that is used to select which system will operate in cases in which the tracking control system and the headway distance control system are selected to operate simultaneously. The control device 3A permits the operation of whichever system has been selected by the control selection switch 14. Thus, the selected system is permitted to operate and the operating system is switched in cases in which the driver clearly demonstrates a desire to switch systems; i.e., in cases in which the driver uses the control selection switch 14 to select the system to be operated. It is therefore possible to prevent instances of switching to the system not desired by the driver.

(3) The control device 3A causes the display device 6 to display the operating state of the currently operating system selected from the tracking control system and the headway distance control system. The driver can thereby easily recognize the currently operating system.

(4) In cases in which the tracking control system and the headway distance control system are selected simultaneously, the control device 3A causes the display device 6 to display that the system not currently operating has also been selected to operate. For example, the image I2 is displayed showing the tracking control system that does not operate in state 6, in which both the tracking control system and the headway distance control system are selected, as shown in FIG. 19. It is thereby easy to recognize which systems are selected and which system is currently operating. Furthermore, the driver can be prevented from being confused during a system switch because it is easy to perceive the manner in which the systems will switch by operating the control selection switch 14.

(5) In the vehicle headway distance control apparatus, the driver is notified by the notification device 7 when the operating system will switch in situations in which the tracking control system and the headway distance control system are both selected to operate. It is thereby possible to prevent the driver from misinterpreting the control specifics or control conditions of the system currently operating.

Third Embodiment

The following is a description of a headway maintenance assist system with a vehicle headway distance control apparatus according to the third embodiment of the present invention. The essential configuration of the headway maintenance assist system according to the third embodiment is similar to the second embodiment shown in FIG. 11. The differences with the first and second embodiments described above will be primarily described herein.

The vehicle headway distance control apparatus according to the third embodiment does not turn the tracking control system and the headway distance control system both "off", but instead is capable of directly switching between turning the tracking control system "on" and turning the headway distance control system "on".

Figure 21:
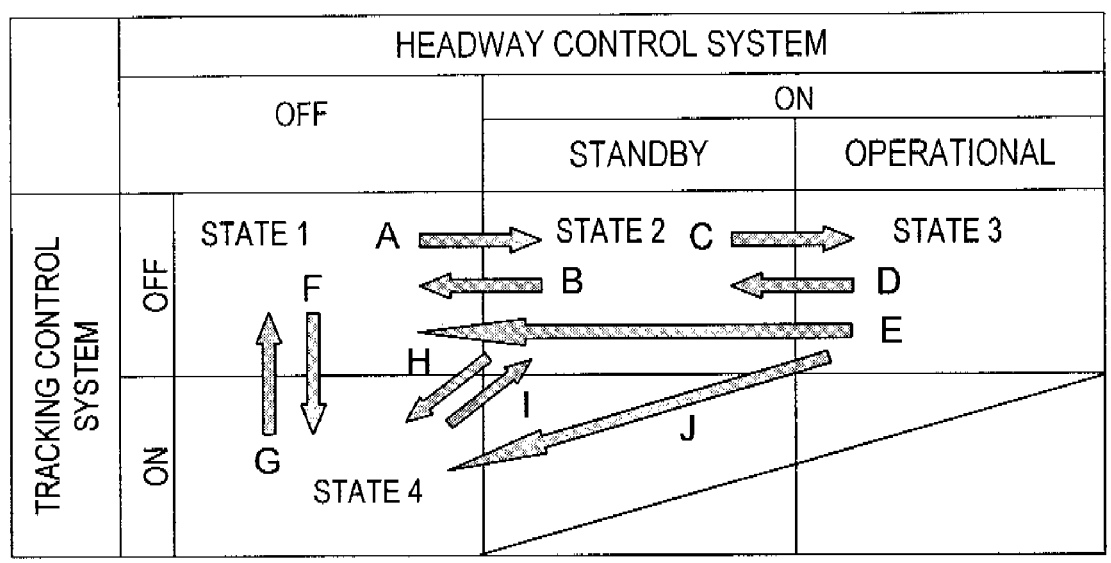
FIG. 21 is a diagram showing the state transitions in a tracking control system and a headway distance control system of a vehicle headway distance control apparatus in accordance with in a third embodiment of the present invention.

FIG. 21 shows the state transitions of the tracking control system and the headway distance control system according to the switches operated by the driver. When the operating switch 13 is turned "on" while the tracking control system is in standby mode, the headway distance control system turns "on" (state transition H). When the main switch 8 is turned "on" while the headway distance control system is "on", the tracking control system goes into standby mode (state transition I). When the operating switch 13 is turned "on" while the tracking control system is operational, the headway distance control system turns "on" (state transition J). The state transitions A through G are similar to those in the first embodiment described above.

The following is a description of the operations pertaining to the state transitions, particularly H through J, between the tracking control system and the headway distance control system that correspond to the switching operations performed by the driver. In FIG. 21, the tracking control system and the headway distance control system are both "off" in state 1, the headway distance control system is "off" while the tracking control system is in standby mode in state 2, the headway distance control system is "off" while the tracking control system is operational in state 3, and the headway distance control system is "on" while the tracking control system is "off" in state 4.

Figure 22:
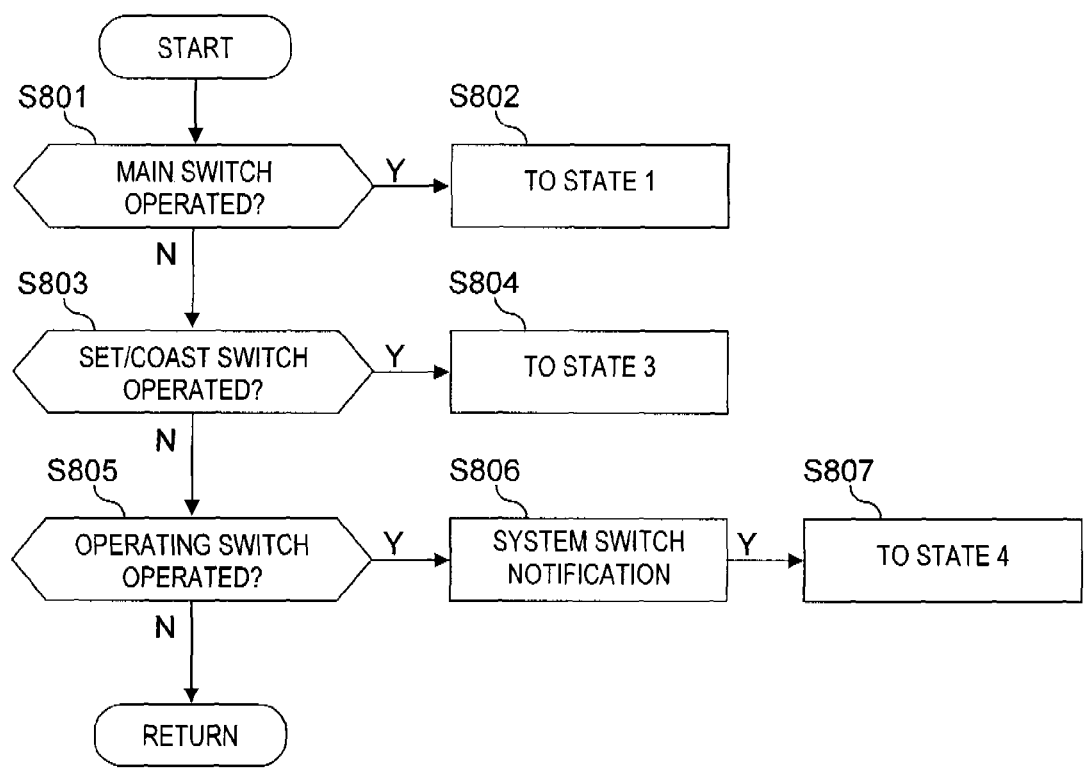
FIG. 22 is a flowchart showing the sequence executed by the control unit for carrying out the state transition process when the systems are in state 2.

FIG. 22 shows a flowchart of the sequence for carrying out the state transition process in state 2 implemented by the control device 3 in the third embodiment.

A determination is made in step S801 as to whether the main switch 8 has been operated. In cases in which the main switch 8 has been operated, the process advances to step S802 and state 1 goes into effect. In cases in which the main switch 8 has not been operated, the process advances to step S803, and a determination is made as to whether the set/coast switch 9 has been operated. In cases in which the set/coast switch 9 has been operated, the process advances to step S804 and state 3 goes into effect.

In cases in which the set/coast switch 9 has not been operated, the process advances to step S805, and a determination is made as to whether the operating switch 13 has been operated. In cases in which the operating switch 13 has been operated, the process advances to step S806, and the notification device 7 is instructed to notify the driver that control will switch from the tracking control system to the headway distance control system. The notification device 7 produces an audible notification such as a beep, for example, according to the instruction from the control device 3A. The control device 3A outputs an instruction to the display device 6 at this time, and the display may be switched so as to turn "off" the display for the tracking control system and turn "on" the display for the headway distance control system. The process then advances to step S807 and state 4 goes into effect (state transition H). In cases in which the operating switch 13 has not been operated, state 2 stays in effect and the process is complete.

Figure 23:
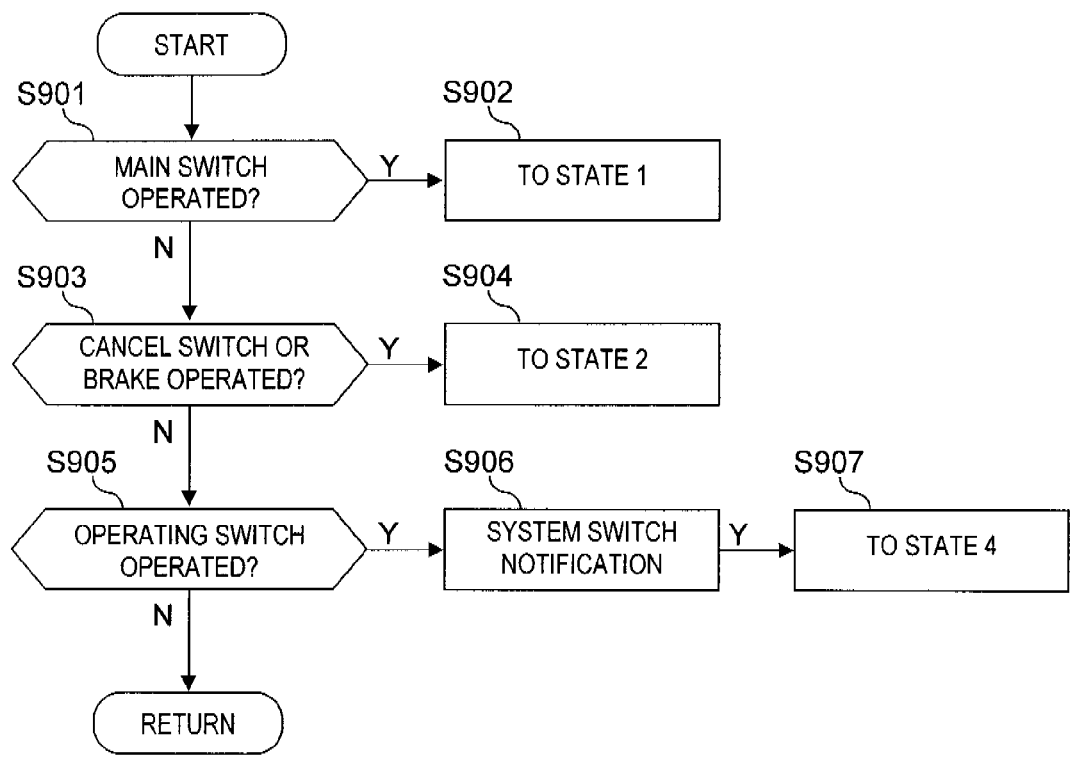
FIG. 23 is a flowchart showing the sequence executed by the control unit for carrying out the state transition process when the systems are in state 3.

FIG. 23 shows a flowchart of the procedure for the state transition process in state 3 implemented by the control device 3.

A determination is made in step S901 as to whether the main switch 8 has been operated. In cases in which the main switch 8 has been operated, the process advances to step S902 and state 1 goes into effect. In cases in which the main switch 8 has not been operated, the process advances to step S903, and a determination is made as to whether an operation of the cancel switch 11 or the brake pedal has been sensed. In cases in which the cancel switch 11 or brake pedal has been operated, the process advances to step S904 and state 2 goes into effect.

In cases in which neither the cancel switch 11 nor brake pedal has been operated, the process advances to step S905, and a determination is made as to whether the operating switch 13 has been operated. In cases in which the operating switch 13 has been operated, the process advances to step S906, and the notification device 7 is instructed to notify the driver that control will switch from the tracking control system to the headway distance control system. The notification device 7 produces an audible notification such as a beep, for example, according to the instruction from the control device 3A. The notification to the driver is not limited to this option alone, and another possibility, for example, is for deceleration control by the headway distance control system to be initiated after deceleration control by the tracking control system is temporarily released when deceleration control is switched from the tracking control system to the headway distance control system. The switching of braking control causes vehicle behavior to change so that the deceleration rate is temporarily lost (G loss occurs), and the driver can be reliably informed of the control switch. Furthermore, the control device 3A may output an instruction to the display device 6 to switch the display so as to turn "off" the display of the tracking control system and turn "on" the display of the headway distance control system. The process then advances to step S907 and state 4 goes into effect (state transition J). In cases in which the operating switch 13 is not operated, state 3 stays in effect and the process is complete.

Figure 24:
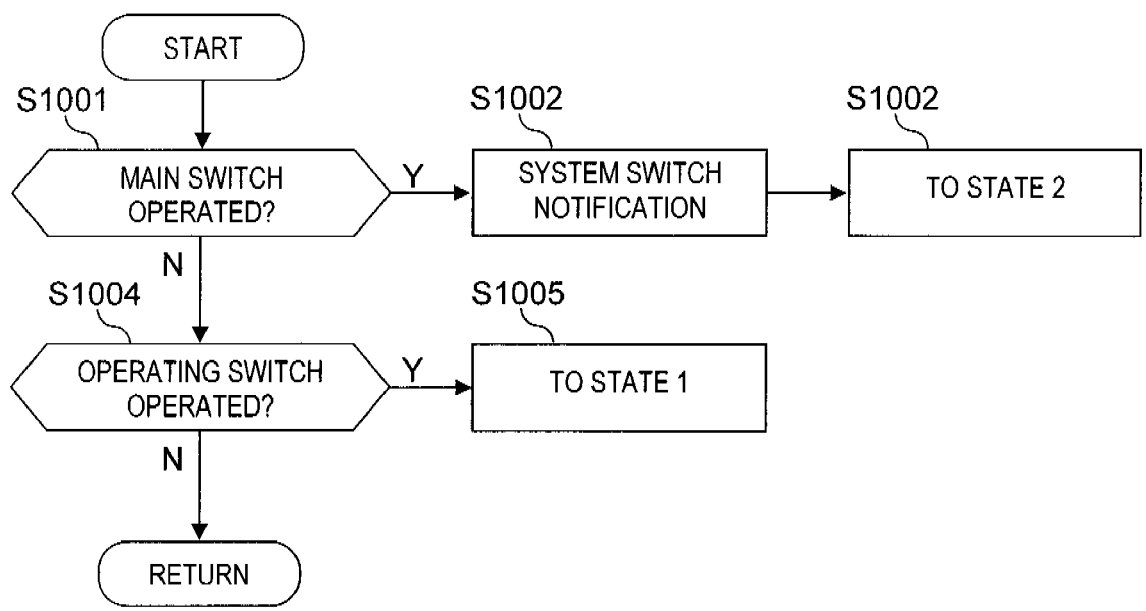
FIG. 24 is a flowchart showing the sequence executed by the control unit for carrying out the state transition process when the systems are in state 4.

FIG. 24 shows a flowchart of the sequence for carrying out the state transition process in state 4 implemented by the control device 3.

A determination is made in step S1001 as to whether the main switch 8 has been operated. In cases in which the main switch 8 has been operated, the process advances to step S1002, and the notification device 7 is instructed to notify the driver that control will switch from the tracking control system to the headway distance control system. The notification device 7 produces an audible notification such as a beep, for example, according to the instruction from the control device 3A. The control device 3A outputs an instruction to the display device 6 at this time, and the display may be switched so as to turn "off" the display of the tracking control system and turn "on" the display of the headway distance control system. The process then advances to step S1003 and state 2 goes into effect (state transition I). In cases in which the main switch 8 has not been operated, the process advances to step S1004, and a determination is made as to whether the operating switch 13 has been operated. In cases in which the operating switch 13 has been operated, the process advances to step S1005 and state 1 goes into effect. In cases in which the operating switch 13 has not been operated, state 4 stays in effect and the process is complete.

Thus, in the third embodiment described above, it is possible to prevent the driver from misinterpreting the control specifics or control factors of the system currently operating, because the tracking control system and the headway distance control system cannot be simultaneously selected to operate, similar to the first embodiment described above. The system can also easily be switched because it is possible to directly switch between operating the tracking control system and operating the headway distance control system.

In the first through third embodiments described above, tracking control and headway distance control were described as an example of multiple different deceleration controls that correspond to the headway distance between a vehicle and a preceding obstacle. The present invention is not limited to these embodiments, however, and the detailed specifics of the controls can be altered appropriately. For example, accelerator pedal control may be omitted from the headway distance control. Also, the operating switches 8 through 14 can be disposed in locations not on the steering wheel.

In the first through third embodiments described above, the tracking control system and headway distance control system can function as first and second deceleration control means; the main switch 8, the set/coast switch 9, the resume acceleration switch 10, the cancel switch 11, and the operating switch 13 can function as operation-selecting means; the control devices 3 and 3A can function as control means, notification control means, and display control means; and the control selection switch 14 can function as control selection means. The control means, the notification control means, and the display control means are all configured from the control devices 3 and 3A, but these can also be configured as separate devices. The above descriptions are only one example, and when the invention is interpreted, there are no limits or restrictions of any kind on the corresponding relationship between the disclosures in the embodiments and the disclosures in the claims.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A headway maintenance assist system comprising:
a first deceleration control system configured to perform a first deceleration control of a host vehicle according to a detected distance between the host vehicle and a preceding obstacle;
a second deceleration control system configured to perform a second deceleration control of the host vehicle according to the detected distance, in which the second deceleration control is different from the first deceleration control;
a driver operable selection section configured to allow a driver to arbitrarily turn "on" and "off" each of the first and second deceleration control systems, while prohibiting simultaneous operation of both of the first and second deceleration control systems; and
a preceding vehicle detection section configured to detect a preceding vehicle in front of the host vehicle as the preceding obstacle;
the first deceleration control system being configured to selectively control both acceleration and deceleration of the host vehicle in response to changes in the detected distance between the host vehicle and the preceding vehicle; and
the second deceleration control system being configured to only control deceleration in relation to the preceding vehicle.

2. The headway maintenance assist system according to claim 1, wherein
the driver operable selection section is configured to allow an arbitrary selection of one of the first and second deceleration control systems only when the first and second deceleration control systems are both "off".

3. The headway maintenance assist system according to claim 2, further comprising
a notification section configured to notify the driver that selection is not possible when one of the first and second deceleration control systems is turned "on" by the driver operable selection section while the other the first and second deceleration control systems is operating.

4. The headway maintenance assist system according to claim 1, wherein
the driver operable selection section further comprises a control unit configured to allow only one of the first and second deceleration control systems to operate when the first and second deceleration control systems are both turned "on".

5. The headway maintenance assist system according to claim 4, wherein
the driver operable selection section further comprises a control selection unit configured to select which one of the first and second deceleration control systems will be given priority to operate when the first and second deceleration control systems are turned "on" simultaneously; and
the control unit is configured to permit operation of the one of the first and second deceleration control systems that has been selected by the control selection unit as having been given priority.

6. The headway maintenance assist system according to claim 4, further comprising
a display unit configured to display an indication of which of the first and second deceleration control systems has been permitted to operate, and which of the first and second deceleration control systems is not operating, when the first and second deceleration control systems are turned "on" simultaneously.

7. The headway maintenance assist system according to claim 4, wherein
the control unit is configured to turn "off" one of the first and second deceleration control systems that was currently "on" and then turn "on" the other of the first and second deceleration control systems that was currently "off" in response to selection of the first and second deceleration control systems that was currently "off" when the one of the first and second deceleration control systems that was currently "on" is in operation.

8. The headway maintenance assist system according to claim 4, further comprising
a notification section configured to notify the driver of switching operation being performed when one of the first and second deceleration control systems being operated by the control unit is switched to the other of the first and second deceleration control systems.

9. The headway maintenance assist system according to claim 4, wherein
the control unit is configured to initiate operation of one of the first and second deceleration controls after halting operation of the other of the first and second deceleration controls when the one of the first and second deceleration control systems being operated by the control unit is switched to the other of the first and second deceleration control systems.

10. A vehicle comprising the headway maintenance assist system according to claim 1.

11. A headway maintenance assist system comprising:
first deceleration control means for performing a first deceleration control of a host vehicle according to a detected distance between the host vehicle and a preceding obstacle;
second deceleration control means for performing a second deceleration control of the host vehicle according to the detected distance, which is different from the first deceleration control;
driver selection means for allowing a driver to arbitrarily turn "on" one of the first and second deceleration control means and turn "off" the other of the first and second deceleration control means while one of the first and second deceleration control means selected from the first and second deceleration control means is operational; and
preceding vehicle detection means for detecting a preceding vehicle in front of the host vehicle as the preceding obstacle;
the first deceleration control means being configured to selectively control both acceleration and deceleration of the host vehicle in response to changes in the detected distance between the host vehicle and the preceding vehicle; and
the second deceleration control means being configured to only control deceleration in relation to the preceding vehicle.

12. A headway maintenance assist method comprising:
providing a deceleration control system configured to selectively perform one of first and second different deceleration controls of a host vehicle according to a detected distance between the host vehicle and a preceding obstacle;
sensing a selection of one of the first and second different deceleration controls by a driver during operation of one of the first and second different deceleration controls;
performing the one of the first and second different deceleration controls in accordance with the selection by the driver and prohibiting the other of the first and second different deceleration controls from being performed in accordance with the selection by the driver; and
detecting a preceding vehicle in front of the host vehicle as the preceding obstacle;
the first deceleration control selectively controlling both acceleration and deceleration of the host vehicle in response to changes in the detected distance between the host vehicle and the preceding vehicle; and
the second deceleration control only controlling deceleration in relation to the preceding vehicle.

13. A headway maintenance assist system comprising:
a first deceleration control system configured to perform a first deceleration control of a host vehicle according to a detected distance between the host vehicle and a preceding obstacle;
a second deceleration control system configured to perform a second deceleration control of the host vehicle according to the detected distance, in which the second deceleration control is different from the first deceleration control; and
a driver operable selection section configured to allow a driver to arbitrarily turn "on" and "off" each of the first and second deceleration control systems, while prohibiting simultaneous operation of both of the first and second deceleration control systems, the driver operable selection section comprising:
a first selection operating unit configured to selectively turn "on" or "off" the first deceleration control system by the driver; and
a second selection operating unit configured to selectively turn "on" or "off" the second deceleration control system by the driver.

14. A headway maintenance assist system comprising:
a first deceleration control system configured to perform a first deceleration control of a host vehicle according to a detected distance between the host vehicle and a preceding obstacle;
a second deceleration control system configured to perform a second deceleration control of the host vehicle according to the detected distance, in which the second deceleration control is different from the first deceleration control; and
a driver operable selection section configured to allow a driver to arbitrarily turn "on" and "off" each of the first and second deceleration control systems, while prohibiting simultaneous operation of both of the first and second deceleration control systems;
wherein
the first deceleration control system is configured to cease the first deceleration control upon detecting a braking operation by the driver; and
the second deceleration control system is configured to continue the second deceleration control during the braking operation by the driver if the second deceleration control was being performed prior to the braking operation by the driver.

15. A headway maintenance assist system comprising:
a first deceleration control system configured to perform a first deceleration control of a host vehicle according to a detected distance between the host vehicle and a preceding obstacle;
a second deceleration control system configured to perform a second deceleration control of the host vehicle according to the detected distance, in which the second deceleration control is different from the first deceleration control; and
a driver operable selection section configured to allow a driver to arbitrarily turn "on" and "off" each of the first and second deceleration control systems, while prohibiting simultaneous operation of both of the first and second deceleration control systems;
wherein
the first deceleration control system is configured to cease the first deceleration control upon detecting an acceleration operation by the driver; and
the second deceleration control system is configured to cease the second deceleration control upon detecting the acceleration operation by the driver, and perform reaction force control for applying reaction force to an accelerator of the host vehicle when a headway distance from the preceding obstacle is equal to or less than a prescribed value.

16. A headway maintenance assist method comprising:
providing a deceleration control system configured to selectively perform one of first and second different deceleration controls of a host vehicle according to a detected distance between the host vehicle and a preceding obstacle;
sensing a selection of one of the first and second different deceleration controls by a driver during operation of one of the first and second different deceleration controls;
operating a first selection operating unit to selectively turn "on" or "off" the first deceleration control by the driver;
operating a second selection operating unit to selectively turn "on" or "off" the second deceleration control by the driver; and
performing the one of the first and second different deceleration controls in accordance with the selection by the driver and prohibiting the other of the first and second different deceleration controls from being performed in accordance with the selection by the driver.

17. A headway maintenance assist method comprising:
providing a deceleration control system configured to selectively perform one of first and second different deceleration controls of a host vehicle according to a detected distance between the host vehicle and a preceding obstacle;
sensing a selection of one of the first and second different deceleration controls by a driver during operation of one of the first and second different deceleration controls; and
performing the one of the first and second different deceleration controls in accordance with the selection by the driver and prohibiting the other of the first and second different deceleration controls from being performed in accordance with the selection by the driver;
wherein
the first deceleration control ceases the first deceleration control upon detecting a braking operation by the driver; and
the second deceleration control continues the second deceleration control during the braking operation by the driver if the second deceleration control was being performed prior to the braking operation by the driver.

18. A headway maintenance assist method comprising:
providing a deceleration control system configured to selectively perform one of first and second different deceleration controls of a host vehicle according to a detected distance between the host vehicle and a preceding obstacle;
sensing a selection of one of the first and second different deceleration controls by a driver during operation of one of the first and second different deceleration controls; and
performing the one of the first and second different deceleration controls in accordance with the selection by the driver and prohibiting the other of the first and second different deceleration controls from being performed in accordance with the selection by the driver;
wherein
the first deceleration control ceases the first deceleration control upon detecting an acceleration operation by the driver; and
the second deceleration control ceases the second deceleration control upon detecting the acceleration operation by the driver, and performs reaction force control for applying reaction force to an accelerator of the host vehicle when a headway distance from the preceding obstacle is equal to or less than a prescribed value.

* * * * *